(12) United States Patent
Zhang et al.

(10) Patent No.: US 12,159,650 B2
(45) Date of Patent: Dec. 3, 2024

(54) METHOD AND APPARATUS, ELECTRONIC DEVICE, AND STORAGE MEDIUM FOR VIDEO EDITING

(71) Applicant: Beijing Zitiao Network Technology Co., Ltd., Beijing (CN)

(72) Inventors: Xiaoran Zhang, Beijing (CN); Yuan Zhang, Beijing (CN); Xinyi Zha, Beijing (CN); Zhirui Jiang, Beijing (CN); Min Shen, Beijing (CN); Yu Zhang, Beijing (CN); Yan He, Beijing (CN); Jiahui Qiu, Beijing (CN); Shangshang Xiang, Beijing (CN); Long Ma, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/391,398

(22) Filed: Dec. 20, 2023

(65) Prior Publication Data
US 2024/0153536 A1 May 9, 2024

Related U.S. Application Data

(63) Continuation of application No. PCT/CN2023/130021, filed on Nov. 6, 2023.

(30) Foreign Application Priority Data

Nov. 7, 2022 (CN) .......................... 202211387598.5

(51) Int. Cl.
*G11B 27/036* (2006.01)
(52) U.S. Cl.
CPC ................. *G11B 27/036* (2013.01)

(58) Field of Classification Search
CPC .................................................. G11B 27/036
See application file for complete search history.

(56) References Cited

U.S. PATENT DOCUMENTS

2023/0412855 A1\* 12/2023 Heckman ................ G06F 11/07

FOREIGN PATENT DOCUMENTS

| CN | 107256117 A | 10/2017 |
| CN | 110139159 A | 8/2019 |

(Continued)

OTHER PUBLICATIONS

International Patent Application No. PCT/CN2023/130021; Int'l Search Report; dated Mar. 22, 2024; 3 pages.

*Primary Examiner* — Girumsew Wendmagegn
(74) *Attorney, Agent, or Firm* — BakerHostetler

(57) ABSTRACT

Embodiments of the present disclosure provide a video editing method and apparatus, an electronic device, and a storage medium. The method comprises: creating at least one editing subtask for a video editing task; in response to a first operation for triggering a target editing subtask, obtaining an initial video material and presenting an editing interface of the target editing subtask; recording the editing operation triggered in the editing interface and presenting an indication identifier of the editing operation in the editing track; generating an editing result of the target editing subtask based on the recorded information of the editing operation and the initial video material; based on the editing result of each editing subtask of the video editing task, generating a target video as an editing result of the video editing task.

20 Claims, 29 Drawing Sheets

(56) References Cited

FOREIGN PATENT DOCUMENTS

| | | |
|---|---|---|
| CN | 111221657 A | 6/2020 |
| CN | 113395541 A | 9/2021 |
| CN | 113411655 A | 9/2021 |
| CN | 113891113 A | 1/2022 |
| CN | 114816686 A | 7/2022 |
| CN | 115297272 A | 11/2022 |
| KR | 2008-0104415 A | 12/2008 |

* cited by examiner

METHOD AND APPARATUS, ELECTRONIC DEVICE, AND STORAGE MEDIUM FOR VIDEO EDITING

CROSS-REFERENCE TO RELATED APPLICATION(S)

This application is a continuation of International Application No. PCT/CN2023/130021 filed on Nov. 6, 2023, which claims priority to Chinese Application No. 202211387598.5 filed on Nov. 7, 2022, the disclosures of which are incorporated herein by reference in their entities.

FIELD

Embodiments of the present disclosure relate to video processing technologies, and particularly to a video editing method and apparatus, an electronic device and a storage medium.

BACKGROUND

With constant development of technologies, there are more and more short video software. Short video software may be selected and used for creation and editing to generate video.

In a relevant scheme, background music is usually matched for a video by using a click video mode or a video clipping tool is used to clip the obtained video. However, the click video mode is only adapted to match the appropriate background music to the video of a specified action, and can only satisfy creation of a small part of videos. However, the use of video clipping tools exhibits a high complexity of clipping, requires a certain clipping skill to perform video creation, exhibits a low clipping efficiency, and clipping errors are prone to occur in the clipping process. Re-clipping might be required once errors occur.

SUMMARY

The present disclosure provides a method and apparatus, an electronic device, and a storage medium for video editing, to achieve visual presentation of video structures, guide a creation process in a component manner and simplify the clipping operations.

In a first aspect, embodiments of the present disclosure provide a video editing method comprising:
creating at least one editing subtask for a video editing task;
in response to a first operation for triggering a target editing subtask, obtaining an initial video material and presenting an editing interface of the target editing subtask, wherein an editing track is presented in the editing interface of the target editing subtask, a video track segment formed based on the initial video material is placed on a video editing track in the editing track, and at least one editing subtask comprises a target video editing subtask;
in an editing process of the target editing subtask, recording the editing operation triggered in the editing interface and present an indication identifier of the editing operation in the editing track;
in response to a second operation for confirming completion of the target editing subtask, generating an editing result of the target editing subtask based on the recorded information of the editing operation and the initial video material;
based on the editing result of each editing subtask of the video editing task, generating a target video as an editing result of the video editing task; in the target video, the initial video material is presented according to the editing effect corresponding to the editing operation.

In a second aspect, embodiments of the present disclosure provide a video editing apparatus comprising:
a creation module configured to create at least one editing subtask for a video editing task;
an edit obtaining module configured to, in response to a first operation for triggering a target editing subtask, obtain an initial video material and present an editing interface of the target editing subtask, wherein an editing track is presented in the editing interface of the target editing subtask, a video track segment formed based on the initial video material is placed on a video editing track in the editing track, and at least one editing subtask comprises a target video editing subtask;
an edit recording module configured to, in an editing process of the target editing subtask, record an editing operation triggered in the editing interface and present an indication identifier of the editing operation in the editing track;
an edit confirming module configured to, in response to a second operation for confirming completion of the target editing subtask, generate an editing result of the target editing subtask based on the recorded information of the editing operation and the initial video material;
a video generating module configured to generate a target video as an editing result of the video editing task based on the editing result of each editing subtask of the video editing task; in the target video, the initial video material is presented according to the editing effect corresponding to the editing operation.

In a third aspect, embodiments of the present disclosure further provide an electronic device comprising:
one or more processors;
a storage device for storing one or more programs,
the one or more programs, when executed by the one or more processors, cause the one or more processors to implement the video editing method according to the first aspect of the present disclosure.

In a fourth aspect, embodiments of the present disclosure further provide a storage medium containing computer-executable instructions which, when executed by a computer processor, implement the video editing method according to the first aspect of the present disclosure.

According to embodiments of the present disclosure, at least one editing subtask is created for a video editing task; in response to a first operation for triggering a target editing subtask, an initial video material is obtained and an editing interface of the target editing subtask is presented, and a video content frame to be edited and generated is visually embodied through each editing subtask created; in the editing process of the target editing subtask, the editing operation triggered in the editing interface is recorded and an indication identifier of the editing operation is presented in the editing track; the editing and generation of the whole video is split by using different editing subtasks, and the video editing is completed by the guidance of different editing subtasks, thereby simplifying the complexity of video editing. Furthermore, even though an editing error occurs in the editing process, the editing subtask where the error occurs may be re-edited, thereby improving the efficiency of video editing and generation.

It should be understood that the description herein is not intended to identify key or critical features of the embodiments of the disclosure or to limit the scope of the present disclosure. Other features of the present disclosure will become readily apparent from the following description.

BRIEF DESCRIPTION OF THE DRAWINGS

The above and other features, advantages, and aspects of embodiments of the present disclosure will become more apparent with reference to the following figures and detailed embodiments. Throughout the figures, the same or similar reference numerals denote the same or similar elements. It should be understood that the figures are diagrammatic and that elements are not necessarily drawn to scale.

DETAILED DESCRIPTION OF EMBODIMENTS

Figure 1:
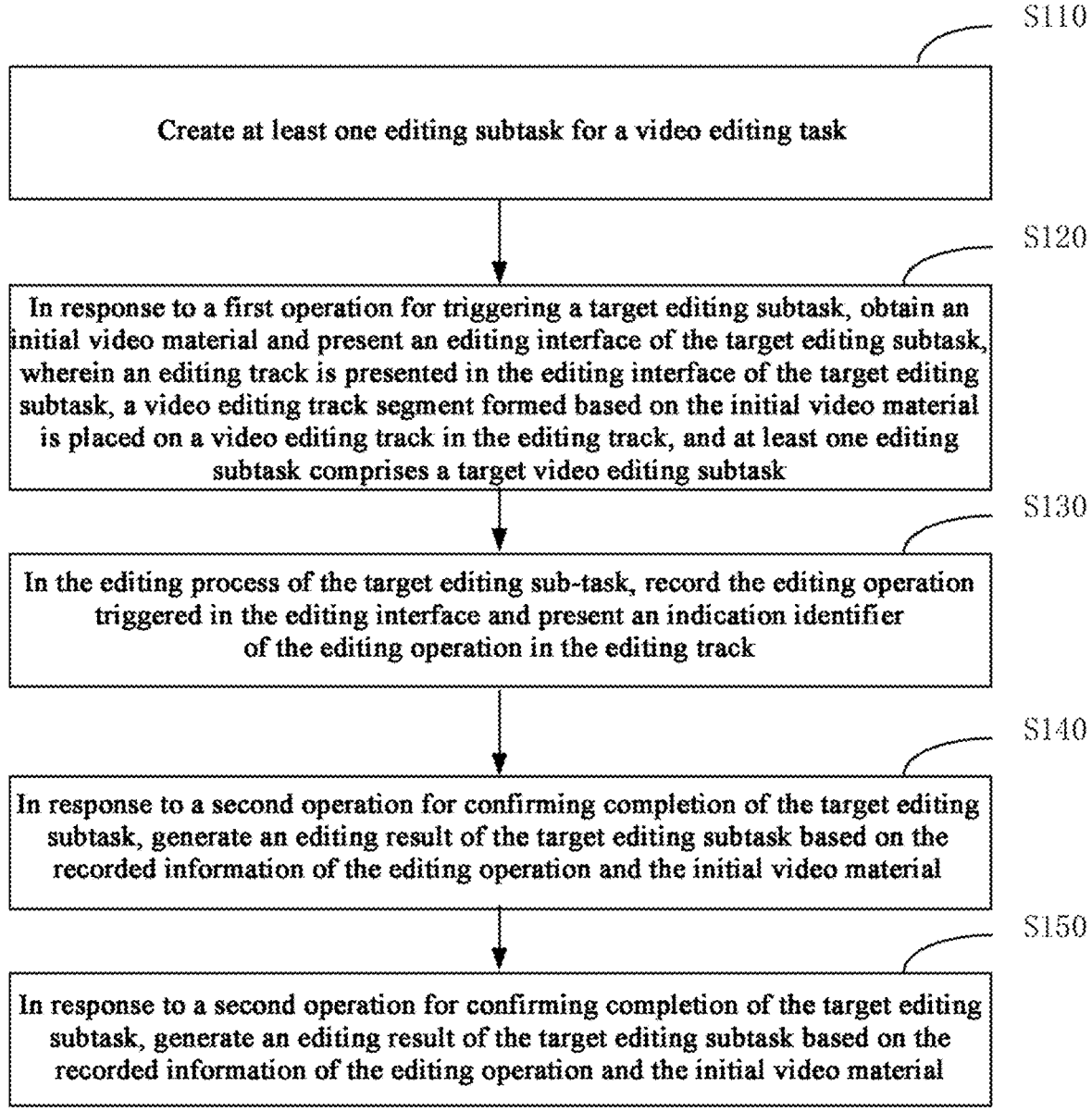
FIG. 1 is a flow chart of a video editing method provided by an embodiment of the present disclosure.

Hereinafter, embodiments of the present disclosure will be described in more detail with reference to the accompanying drawings. While certain embodiments of the present disclosure have been illustrated in the accompanying drawings, it is to be understood that the disclosure may be embodied in various forms and should not be construed as being limited to the embodiments set forth herein; rather, these embodiments are provided to help understand the present disclosure more thoroughly and completely. It should be understood that the drawings and examples of the present disclosure are for illustrative purposes only and are not intended to limit the scope of the present disclosure.

It should be understood that the various steps recited in method embodiments of the present disclosure may be performed in a different order and/or in parallel. Moreover, the method embodiments may comprise additional steps and/or omit performing the steps shown.

The scope of the present disclosure is not limited in this respect.

As used herein, the terms "comprise", and variations thereof are open-ended terms, i.e., "comprise, but not limited to". The term "based on" is "based, at least in part, on". The term "one embodiment" means "at least one embodiment"; the term "another embodiment" means "at least one further embodiment"; the term "some embodiments" means "at least some embodiments". Relevant definitions of other terms will be given in the following description.

It should be noted that concepts such as "first" and "second" mentioned in the present disclosure are only intended to distinguish between different devices, modules, or units and are not intended to limit the order or interdependence of the functions performed by the devices, modules, or units.

It needs to be appreciated that the modifiers "a (or an)" and "a plurality of" in the present disclosure are intended to be illustrative and not restrictive, and those skilled in the art should understand that the modifiers should be understood as "at least one" unless the context clearly indicates otherwise.

The names of messages or information interacted between devices in embodiments of the present disclosure are for illustrative purposes only and are not intended to limit the scope of such messages or information.

It should be understood that prior to using the technical solutions disclosed in the various embodiments of the present disclosure, the user should be informed of the type, scope of use, use scenario, etc. of personal information involved in the present disclosure and authorization should be gained from the user in an appropriate manner according to relevant laws and regulations.

For example, in response to receiving a user's active request, prompt information is sent to the user to explicitly prompt the user that the operation requested to be performed will require obtaining and using the user's personal information. Accordingly, the user himself may decide according to the prompt information whether to provide personal information to software or hardware, such as an electronic device, an application, a server or a storage medium, which executes the operation of the technical solution of the present disclosure.

As an optional but non-limiting implementation, in response to receiving the user's active request, the prompt message may be sent to the user, for example, in the form of a pop-up window in which the prompt message may be presented in text. In addition, the pop-up window may also carry a selection control for the user to select "agree" or "disagree" to provide personal information to the electronic device.

It is to be understood that the above-described process of notifying the user and obtaining authorization from the user is merely illustrative and not intended to limit implementations of the present disclosure, and that other ways of satisfying relevant laws and regulations may also be applied to implementations of the present disclosure.

FIG. 1 is a flow chart of a video editing method provided by an embodiment of the present disclosure. Embodiments of the present disclosure are applicable to a case of editing a video division editing subtask. The method may be executed by a video editing apparatus, the apparatus may be implemented in the form of software and/or hardware, the video editing apparatus may be configured and implemented in any electronic device with a network communication function, and the electronic device may be a mobile terminal, a PC terminal or a server, etc. As shown in FIG. 1, the video editing method of the present embodiment may include, but is not limited to, the following steps:

S110: creating at least one editing subtask for a video editing task.

Figure 2:
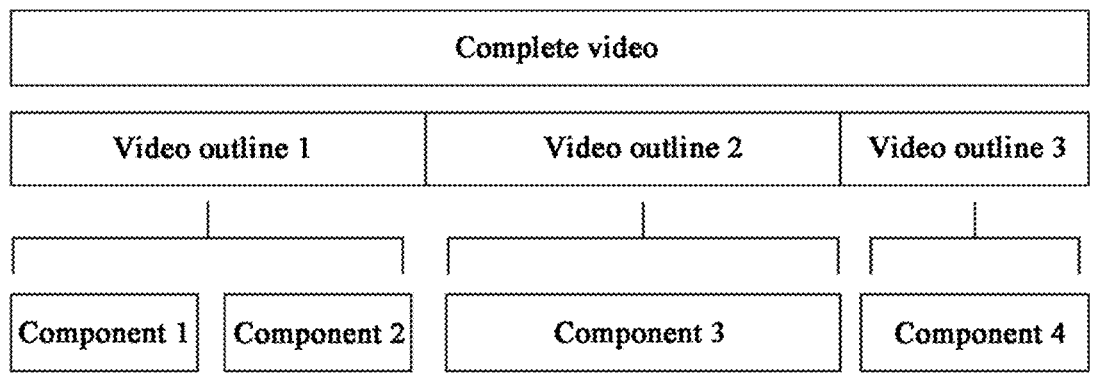
FIG. 2 is a schematic diagram showing a relationship between a video outline and a video editing component corresponding to an editing subtask provided by an embodiment of the present disclosure.

Referring to FIG. 2, a complete video may be divided into at least two video outlines according to the video content, such as video outline 1, video outline 2 and video outline 3 shown in FIG. 2; in this way, different video outlines may be divided according to the video content for different case videos. For each video outline, a video editing subtask may be matched according to a creation form of the video outline, and such a video editing task may comprise at least one editing subtask.

Figure 3:
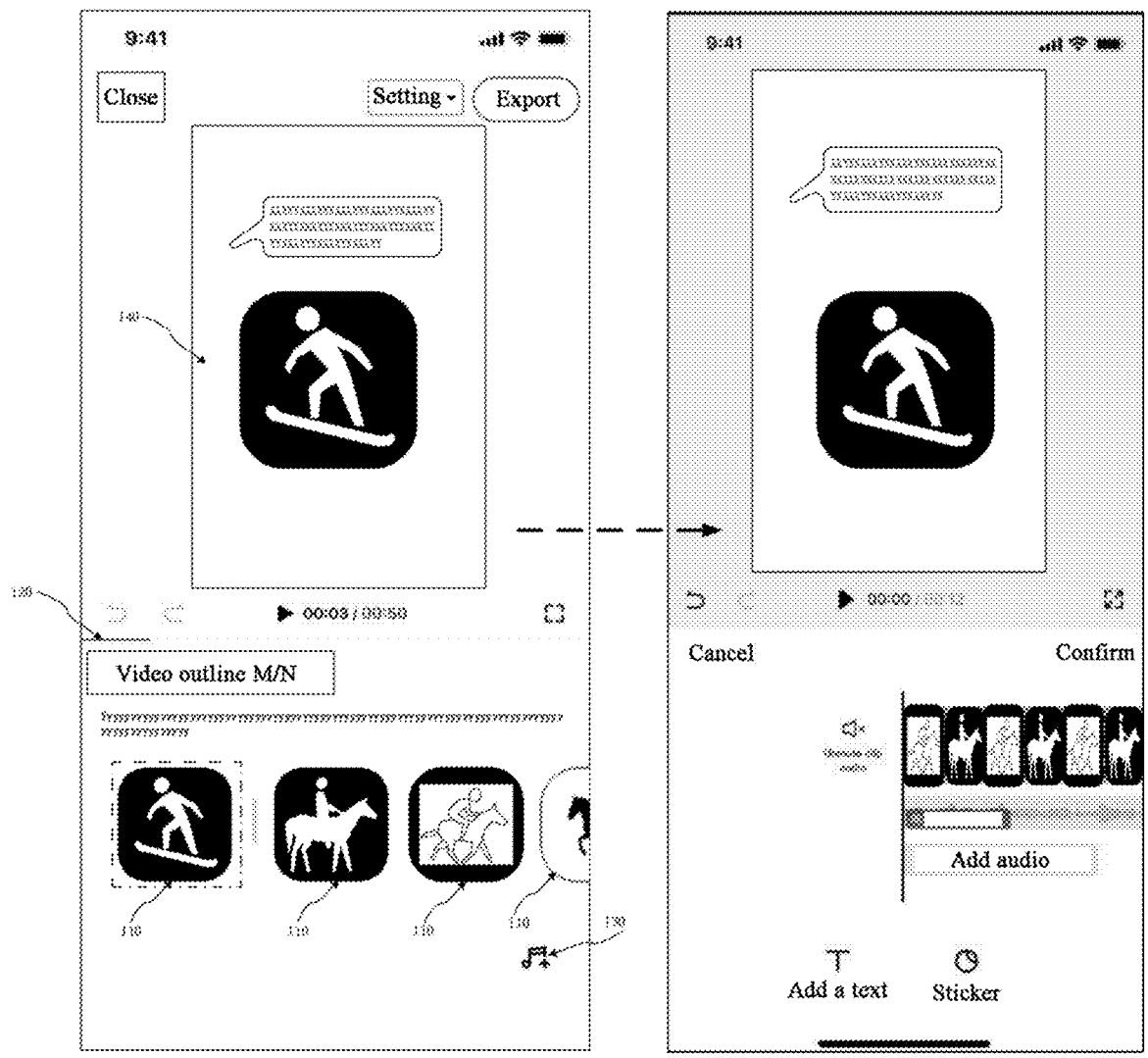
FIG. 3 is a schematic diagram of a video editing component corresponding to an editing subtask displayed by an editing interface of a video editing task provided by an embodiment of the present disclosure.

Referring to FIG. 3, upon entering an editing interface for performing a video editing task, a least two video editing components 110 corresponding to a video outline may be created and displayed on the editing interface, each video editing component 110 corresponds to an editing subtask, and at least one video editing component 110 is included under the same video outline. The video editing component may be the smallest unit in the video editing process. For example, the editing interface of the video editing task may be a main frame page shown in the left diagram in FIG. 3, and the editing interface of the editing subtask may be a preview editing page shown in the right diagram in FIG. 3. Since the display size of the editing interface of the video editing task is limited, part of the video editing component 110 might not be fully presented, and the video editing component 110 hidden on the editing interface of the video editing task may be presented by sliding the video editing component.

Referring to FIG. 2 and FIG. 3, on the editing interface of the video editing task, at least one video editing component may be correspondingly provided in the same video outline, and the video editing component is taken as an editing subtask. For example, taking one piece of video outline information as a video outline M/N as an example, the video outline M/N may represent that the video editing component selected by the dotted line is a video editing component corresponding to the $N^{th}$ editing subtask of the $M^{th}$ video outline, and the types of video editing components set corresponding to the same video outline may be the same or different. The same video editing component belongs to the same video outline, i.e., the same editing subtask cannot belong to different video outline at the same time.

In the above-mentioned manner, a video content frame to be edited and generated is visually embodied through each editing subtask created, so that different editing modes may be clearly prompted in the video editing process, so as to use a corresponding video editing component to perform video editing subtask creation according to needs, simplify the complexity of video editing and make the video editing process more visual and clearer.

Figure 4:
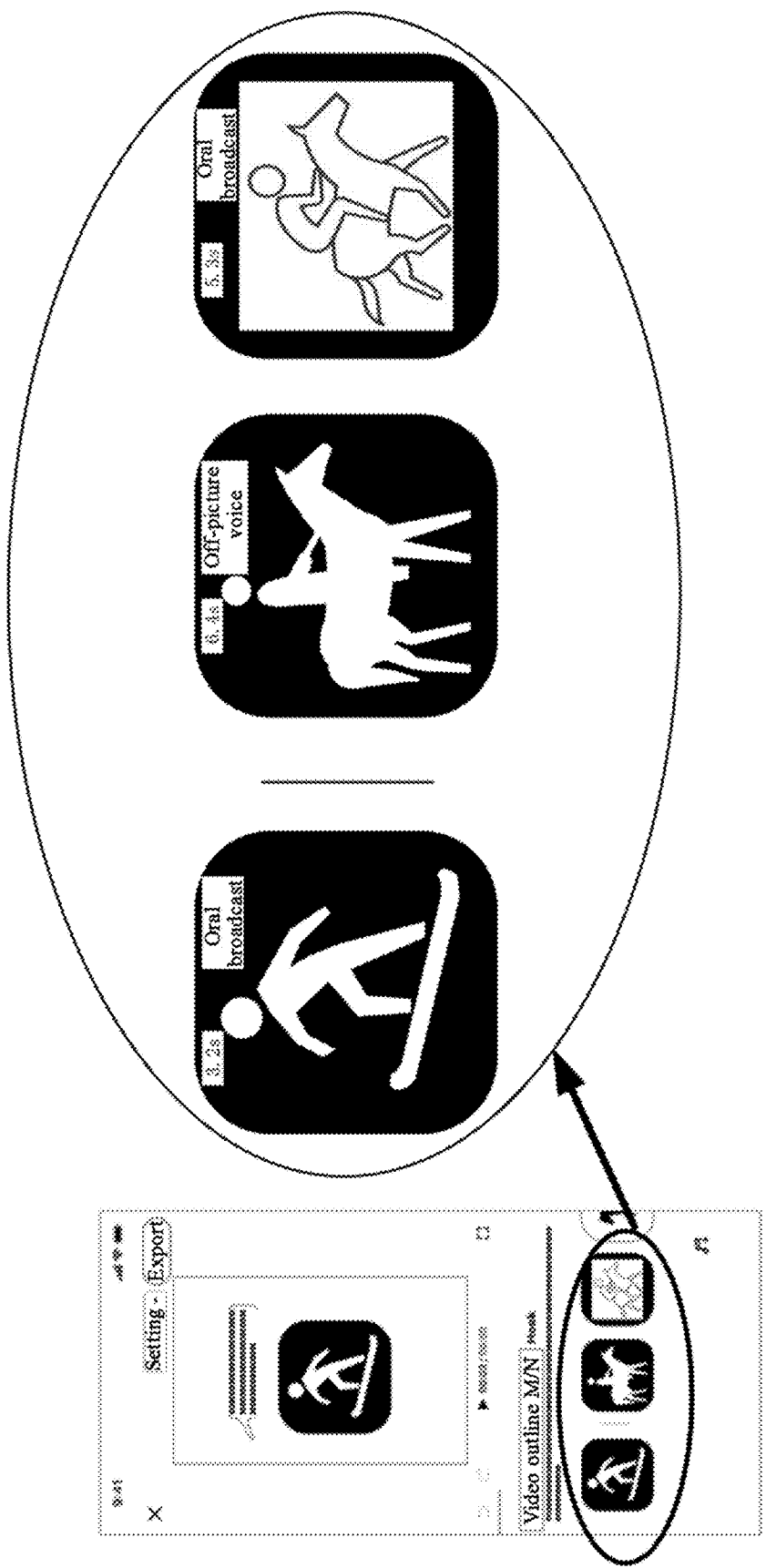
FIG. 4 is a schematic diagram displaying, in an enlarged manner, a video editing component corresponding to an editing subtask displayed by an editing interface of a video editing task provided by an embodiment of the present disclosure.

As an optional but non-limiting implementation, with reference to FIG. 4, the video editing component corresponding to the editing subtask displayed on the editing interface of the video editing task shown in FIG. 3 is displayed in an enlarged manner. A first annotation content and a second annotation content are displayed on the video editing component; the first annotation content describes an editing type of the editing subtask corresponding to the video editing component; the second annotation content describes a duration of a video segment generated by the editing subtask corresponding to the video editing component; and a cover of the video editing component is a first frame of the video segment generated by the editing subtask corresponding to the video editing component.

Optionally, the editing type of the editing subtask corresponding to the video editing component may include off-picture audio-video editing, oral broadcast video editing, and green screen-captured video editing. Wherein main narration content of the off-picture video comes from a narration; the narration is recorded separately, and is generally a human voice or a voice converted from words, and the video picture may jump-over according to the voice content; the oral broadcast video is a video segment that is interpreted by real people. A green screen shot video comprises a video segment narrated by a real person before the camera; the green screen-captured video includes the narration of a real person before the camera against a background of pictures of a product or a screen-recorded video segment.

In the above-mentioned manner, the duration of the video segment of each editing subtask and the video editing manner may be specified during the execution of the video editing subtask, so as to perform video segment deletion and addition for each editing subtask according to actual needs and optimize and adjust the video editing manner to generate a better video.

S120: in response to a first operation for triggering a target editing subtask, obtaining an initial video material and presenting an editing interface of the target editing subtask, wherein an editing track is presented in the editing interface of the target editing subtask, a video track segment formed based on the initial video material is placed on a video editing track in the editing track, and at least one editing subtask comprises the target video editing subtask.

With reference to FIG. 3, with regard to the video editing component corresponding to at least one editing subtask displayed on an editing interface of the video editing task, in response to the first operation on the video editing component, a target editing subtask in the at least one editing subtask is triggered; after the target editing subtask is triggered, the initial video material may be obtained and the interface jumps to display the editing interface of the target editing subtask; and an editing page is used for performing video editing on the editing subtask corresponding to the video editing component. The editing track is presented in the editing interface, and the video track segment formed based on the initial video material is placed on the video editing track in the editing track.

S130: in the editing process of the target editing subtask, recording the editing operation triggered in the editing interface and presenting an indication identifier of the editing operation in the editing track.

Referring to FIG. 3, in an example, in the editing track displayed on the editing page, the video track segment of the editing track may be triggered to perform a video segmentation editing operation, so that editing operation information of the video track segment segmentation performed on the video track may be recorded and an indication indicating that the video track segment has been video-segmented may be presented on the video track. In another example, the video track segment of the editing track may be triggered to perform a video speed-change editing operation, such that editing operation information that the speed change of the video has been performed on the video track segment may be recorded, and an indication indicating that speed change of the video been performed on the video track segment may be presented on the video track. In yet another example, a video special effect editing operation may be triggered on the video track segment of the editing track, such that editing operation information for performing the video special effect on the video track segment may be recorded and an indication indicating that the video special effect operation has been performed on the video track segment may be presented on the video track.

S140: in response to a second operation for confirming completion of the target editing subtask, generating an editing result of the target editing subtask based on the recorded information of the editing operation and the initial video material.

Referring to FIG. 3, after video editing is performed on an editing interface corresponding to each editing subtask created on the editing interface of the video editing task, the second operation may be triggered on the editing interface. The second operation is an operation for confirming the completion of the target editing subtask. At this time, an editing result of each editing subtask may be generated according to a recorded result of the editing operation recorded on the editing interface corresponding to the editing subtask and the initial video material.

In the above-mentioned manner, different forms of video content segments are split in the manner of different editing subtasks in the whole video, and video materials are filled in according to video editing components corresponding to different editing subtasks to form video segments, so as to complete video editing step by step by guiding in editing interfaces of different editing subtasks corresponding to video editing components.

S150: based on the editing result of each editing subtask of the video editing task, generating a target video as an editing result of the video editing task; in the target video, the initial video material is presented according to the editing effect corresponding to the editing operation.

After video editing is performed in the editing subtask corresponding to each video editing component to obtain an editing result of each editing subtask, the editing result of the editing subtask corresponding to each video editing component may be directly used for merging and splicing so as to generate an editing result of the complete video editing task as a target video, thereby generating a final complete video by completing video editing step by step by performing video editing in different editing subtasks corresponding to video editing components by guiding.

As an optional but non-limiting implementation, referring to FIG. 3, the step of, based on an editing result of each editing subtask of the video editing task, generating a target video as an editing result of the video editing task may include but not limited to the following steps A1-A2:

Step A1: obtaining the original audio material; an audio track segment formed based on the original audio material and a video track segment formed based on the editing result of each editing subtask of the video editing task are presented on the editing interface of the video editing task.

Step A2: in response to an editing operation on the audio track segment, obtaining a target audio material; generating the target video based on the editing result of each editing subtask of the video editing task and the target audio material.

Referring to the left diagram of FIG. 3, optionally, a music icon 130 is displayed on the editing interface of the video editing task. When the music is empty, an editor may click the music icon and pull up a music selection page to select a piece of suitable music. Only one piece of music can be added in the whole of the video; after the addition is completed, the interface returns to the editing interface of the video editing task, and enter a music editing panel to edit the added music. Upon entry into an editing template of the video editing task for the first time, the music icon displayed on the editing interface of the video editing task is in an already-added state, click to view the music carried in the editing template, and enter the music editing panel; and a duration of the music is automatically aligned with the duration of the current video.

As an optional but non-limiting implementation, the video editing method of the present embodiment may further comprise the following process: obtaining and saving a target sub-video corresponding to the target editing subtask based on the editing result of the target editing subtask; in the target sub-video, the initial video material is presented according to the editing effect corresponding to the editing operation.

Optionally, the editing result of the target editing subtask may be the video of the target editing subtask based on the recorded information of the editing operation and the initial video material; when the editing result of the target editing subtask is obtained, the video of each target editing subtask may be synthesized into the target video. Optionally, the editing result of the target editing subtask may be an editing draft generated based on the recorded information of the editing operation and the initial video material; when the editing draft of the target editing subtask is obtained, the editing draft of each target editing subtask may be combined first, and then the target video is generated using the combined general editing draft.

In the technical solution of an embodiment of the present disclosure, at least one editing subtask is created for a video editing task; in response to a first operation for triggering a target editing subtask, an initial video material is obtained and an editing interface of the target editing subtask is presented, and a video content frame to be edited and generated is visually embodied through each editing subtask created; in the editing process of the target editing subtask, the editing operation triggered in the editing interface is recorded and an indication identifier of the editing operation is presented in the editing track; the editing and generation of the whole video is split by using different editing subtasks, and the video editing is completed by the guidance of different editing subtasks, thereby simplifying the complexity of video editing. Furthermore, even though an editing error occurs in the editing process, the editing subtask where the error occurs may be re-edited, thereby improving the efficiency of video editing and generation.

Figure 5:
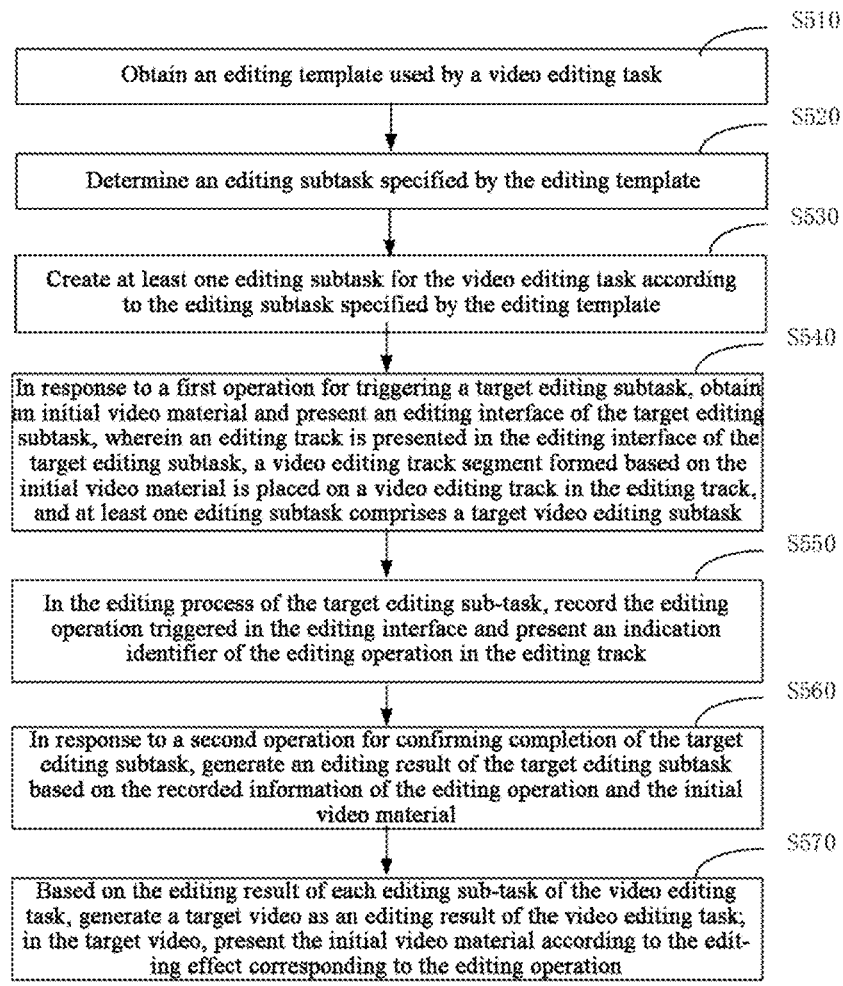
FIG. 5 is a flow chart of another video editing method provided by an embodiment of the present disclosure.

FIG. 5 is a flow chart of another video editing method provided by an embodiment of the present disclosure. On the basis of the above embodiment, the technical solution of the present embodiment further optimizes the process of creating at least one editing subtask for a video editing task in the previous embodiment. The present embodiment may be combined with optional solutions in the above one or more embodiments. As shown in FIG. 5, the video editing method of the present embodiment may include, but is not limited to, the following steps:

S510: obtaining an editing template used by a video editing task.

S520: determining an editing subtask specified by the editing template.

S530: creating at least one editing subtask for the video editing task according to the editing subtask specified by the editing template.

As an optional but non-limiting implementation, the creating at least one editing subtask for the video editing task according to the editing subtask specified by the editing template may include, but is not limited to, the following steps B1-B2:

Step B1: presenting, on an editing interface of the video editing task, an identifier of the editing subtask specified by the editing template.

Figure 6:
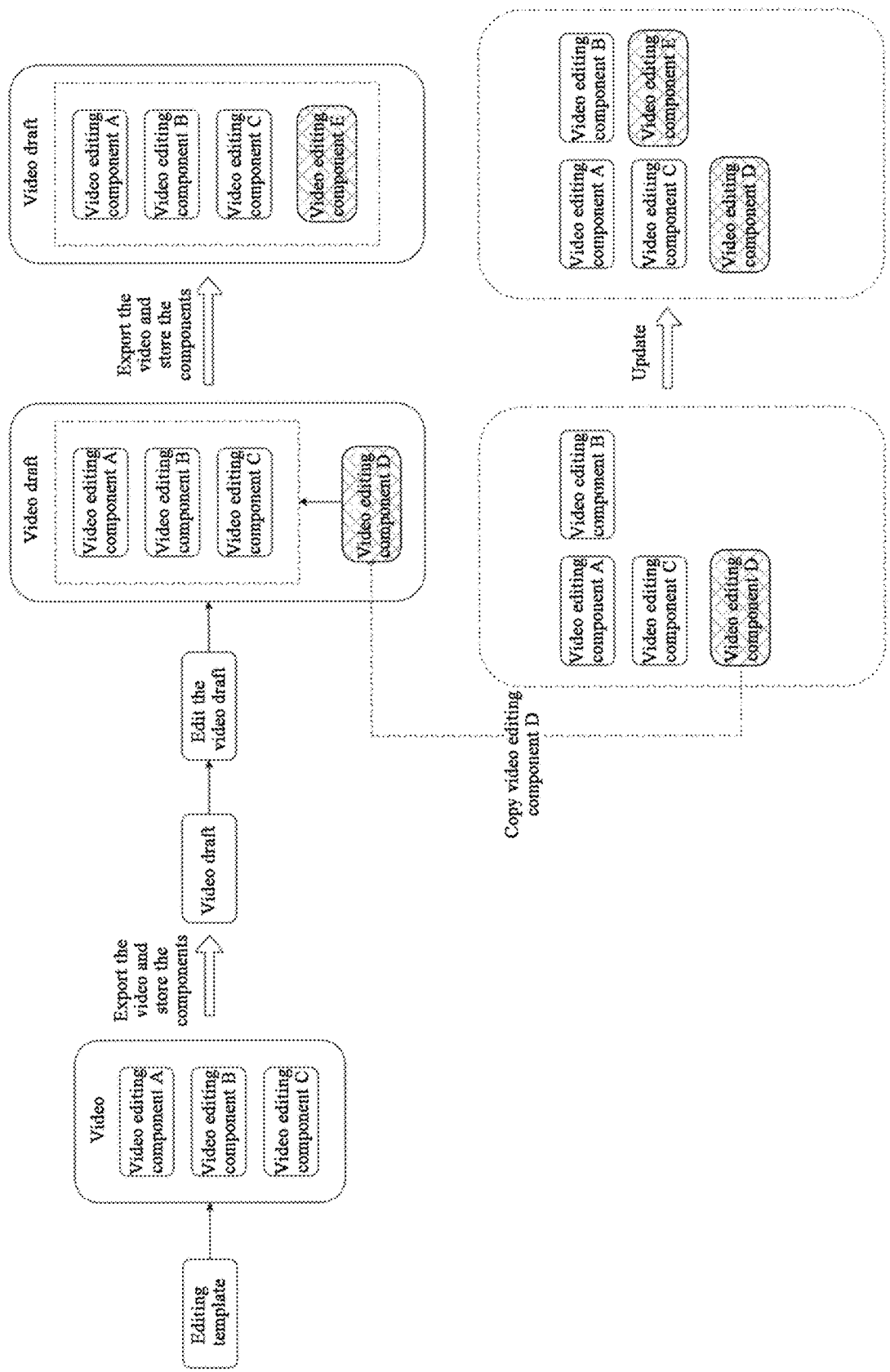
FIG. 6 is a flow chart of a video editing component corresponding to an editing subtask edited and displayed from an editing template of a video editing task as provided by an embodiment of the present disclosure.

Referring to FIG. 2 and FIG. 6, different editing template cases may be pre-configured, and in response to a template triggering operation, an editing template used by the video editing task may be selected when the video editing task is performed, and the editing subtask specified by the editing template may be parsed from the editing template. With reference to FIG. 3 and FIG. 6, in response to triggering the editing template of a selected video editing task, the editing subtasks for performing the video editing task are called, the video editing component for performing the editing subtasks of the video editing task specified by the editing template is displayed on the editing interface of the video editing task, the same video outline corresponds to at least one editing subtask, and each editing subtask corresponds to one video editing component, and an identifier of the editing subtask may be represented by the video editing component displayed on the editing interface of the video editing task. For example, video editing component A, video editing component B, and video editing component C shown in FIG. 6 are presented in the form of identifiers of the editing subtasks.

Step B2: in response to a third operation for triggering to add an editing subtask, adding an identifier of a first editing subtask in the editing interface of the video editing task, and/or in response to a fourth operation for triggering to delete an editing subtask, deleting an identifier of a second editing subtask in the editing interface of the video editing task.

At least one editing subtask comprises an editing subtask having an identifier presented in the editing interface of the video editing task.

In an optional example, in response to the third operation for triggering to add an editing subtask, an identifier of each displayed editing subtask (namely, an identifier for performing visual presentation of a video editing component corresponding to the editing subtask) is selected on the editing interface of the video editing task, and a subtask operation menu of the selected identifier of the editing subtask is displayed synchronously. An editing trigger control, an addition trigger control and a deletion trigger control are displayed in the subtask operation menu.

Figure 7:
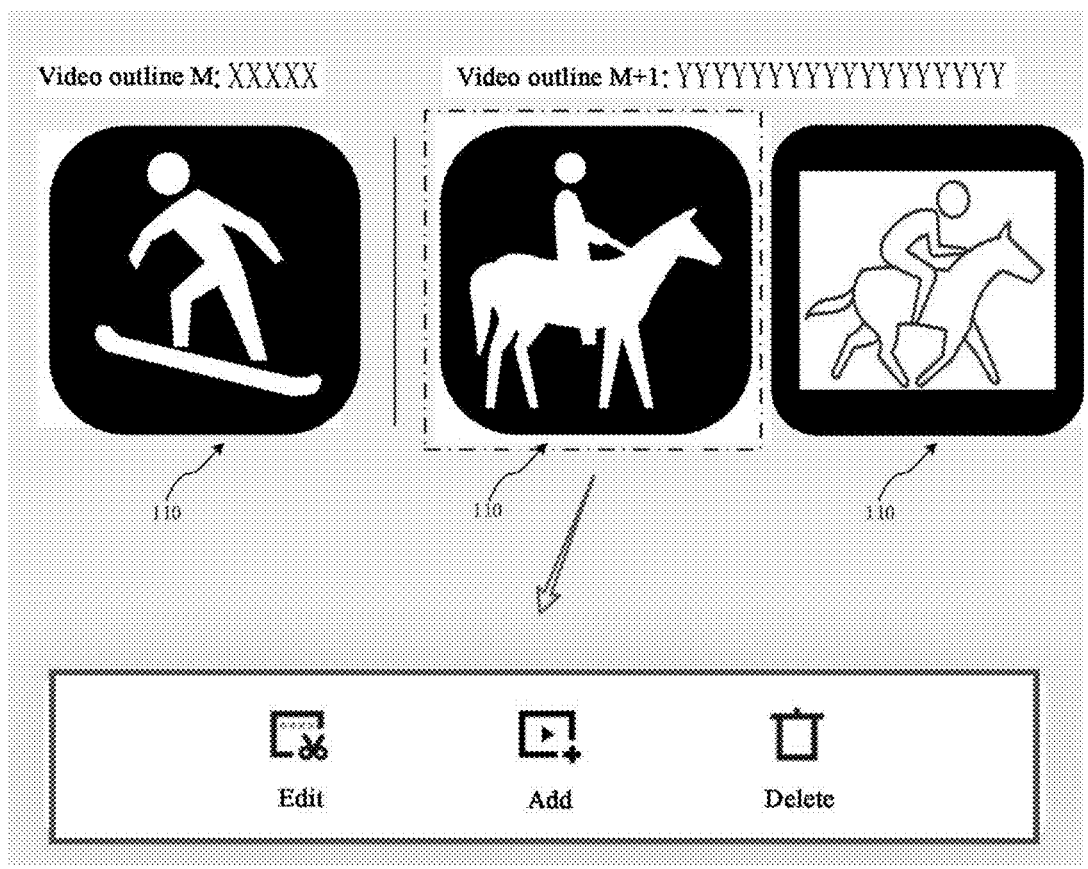
FIG. 7 is a schematic diagram showing an operational menu of a video editing component corresponding to an editing subtask provided by an embodiment of the present disclosure.

With reference to FIG. 7, regarding the video editing component 110 corresponding to each editing subtask displayed on the editing interface of the video editing task, the identifier of the editing subtask may be used in the figure to visually present the video editing component on the editing interface; and in response to a click operation on any video editing component, namely, in response to a click operation on the identifier of one editing subtask, a box selection may be performed on the clicked video editing component 110 on the editing interface of the video editing task, such as select the video editing component 110 of the first editing subtask of the $(M+1)^{th}$ video outline in FIG. 7. When the video editing component 110 is selected, a subtask operation menu of the editing subtask corresponding to the selected video editing component may be pulled up and displayed in a pop-up window in the editing interface of the video editing task. The editing trigger control, the addition trigger control and the deletion trigger control displayed in the subtask operation menu may be click-triggered.

In an optional example, with reference to FIG. 7, in response to the fourth operation for triggering deletion of an editing subtask, an identifier of the displayed second editing subtask (namely, an identifier for performing visual presentation of the video editing component corresponding to the editing subtask) is selected on the editing interface of the video editing task, and a subtask operation menu of the identifier of the second editing subtask is displayed synchronously. An editing trigger control, an addition trigger control and a deletion trigger control are displayed in the subtask operation menu. Through the click of the deletion trigger control by the fourth operation, the identifier of the second editing subtask is deleted from the editing interface of the video editing task, i.e., the video editing component corresponding to the second editing subtask is deleted. Optionally, when the identifier of the second editing subtask is deleted, deletion prompt information of the identifier of the second editing subtask is displayed for a second confirmation of whether to delete the identifier of the second editing subtask. As an optional but non-limiting implementation, the video editing method of the present embodiment may comprise the following process: determining a group designated by the editing template, and presenting the editing subtask designated by the editing template according to the designated group; presenting content prompt information or editing prompt information corresponding to the designated group.

Referring to FIG. 7, each editing subtask in a video editing task corresponding to an editing template is presented on an editing page of the video editing task according to a specified video outline group, and the same video outline group comprises at least one editing subtask. FIG. 7 shows that one video outline group corresponds to at least one video editing group. Each video outline group in the editing page of the video editing task correspondingly presents content prompt information or editing prompt information. The content prompt information comprises a content prompt of the video material corresponding to the video outline group; the editing prompt information comprises prompts related to oral broadcast, an off-picture voice and green screen. The editing prompt information may further comprise prompt information related to a video editing effect such as a filter, a transition, a special effect, etc.

With reference to FIG. 7, optionally, after the identifiers of all editing subtasks corresponding to the same video outline displayed on the editing interface of the video editing task are deleted (which indicates the video editing component is deleted), the video outline information is retained on the editing interface of the video editing task, and a vacancy is displayed under the video outline; the vacancy is used to add the identifier of a new editing subtask when clicked.

As an optional but non-limiting implementation, the third operation for triggering the addition of the editing subtask is specifically a triggering operation of the identifier of the third editing subtask presented on the editing interface of the video editing task; on the editing interface of the video editing task, the identifier of the first editing subtask is added at a position adjacent to the identifier of the third editing subtask.

Figure 8:
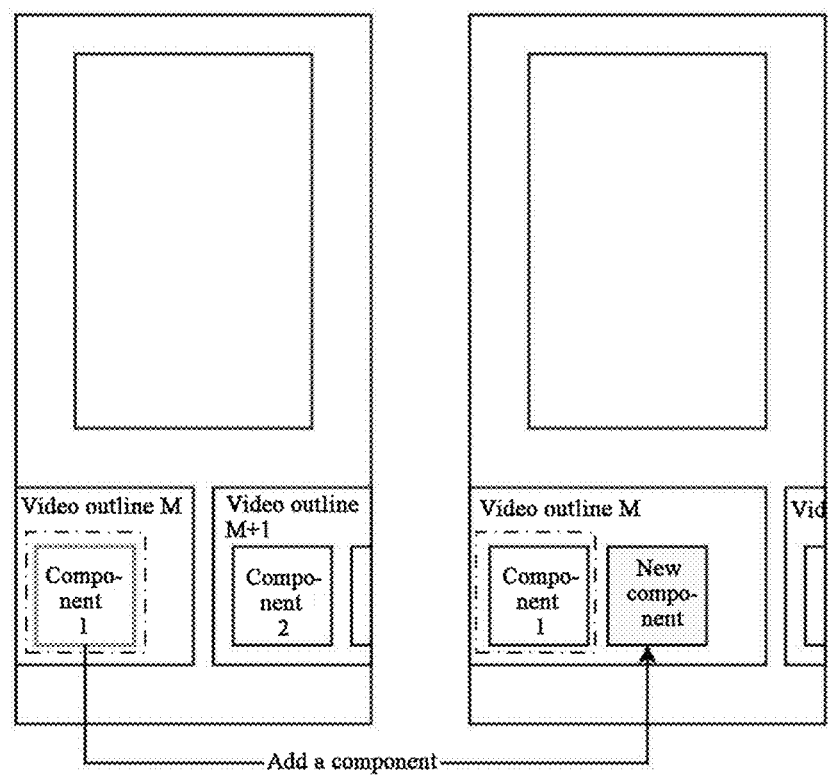
FIG. 8 is a schematic diagram of a video editing component corresponding to a newly added editing subtask in an editing interface of a video editing task provided by an embodiment of the present disclosure.

With reference to FIG. 8, after an identifier of the third editing subtask is selected on the editing interface of the video editing task and the third operation is executed on the identifier of the third editing subtask, a subtask operation menu of the selected third editing subtask is pulled up; the third operation for triggering the addition of the editing subtask further comprises an operation of triggering an editing subtask addition trigger control in the subtask operation menu of the editing subtask. In response to the third operation for triggering to add the editing subtask, an identifier of a first editing subtask is newly added in the editing interface of the video editing task, i.e., a video editing component is newly added in the editing interface of the video editing task.

Referring to FIG. 8, in the editing interface of the video editing task, an identifier of the editing subtask is newly displayed at a position adjacent to the identifier of the selected third editing subtask, and the identifier of the selected third editing subtask and the identifier of the newly added first editing subtask belong to one video outline. Optionally, in response to the third operation for triggering to add the editing subtask, an editing subtask editing mode selection window is displayed on the editing interface of the video editing task; in response to a selection operation in the editing subtask editing mode selection window, the identifier of the selected first editing subtask is newly displayed at a position adjacent to the identifier of the selected third editing subtask.

Figure 9:
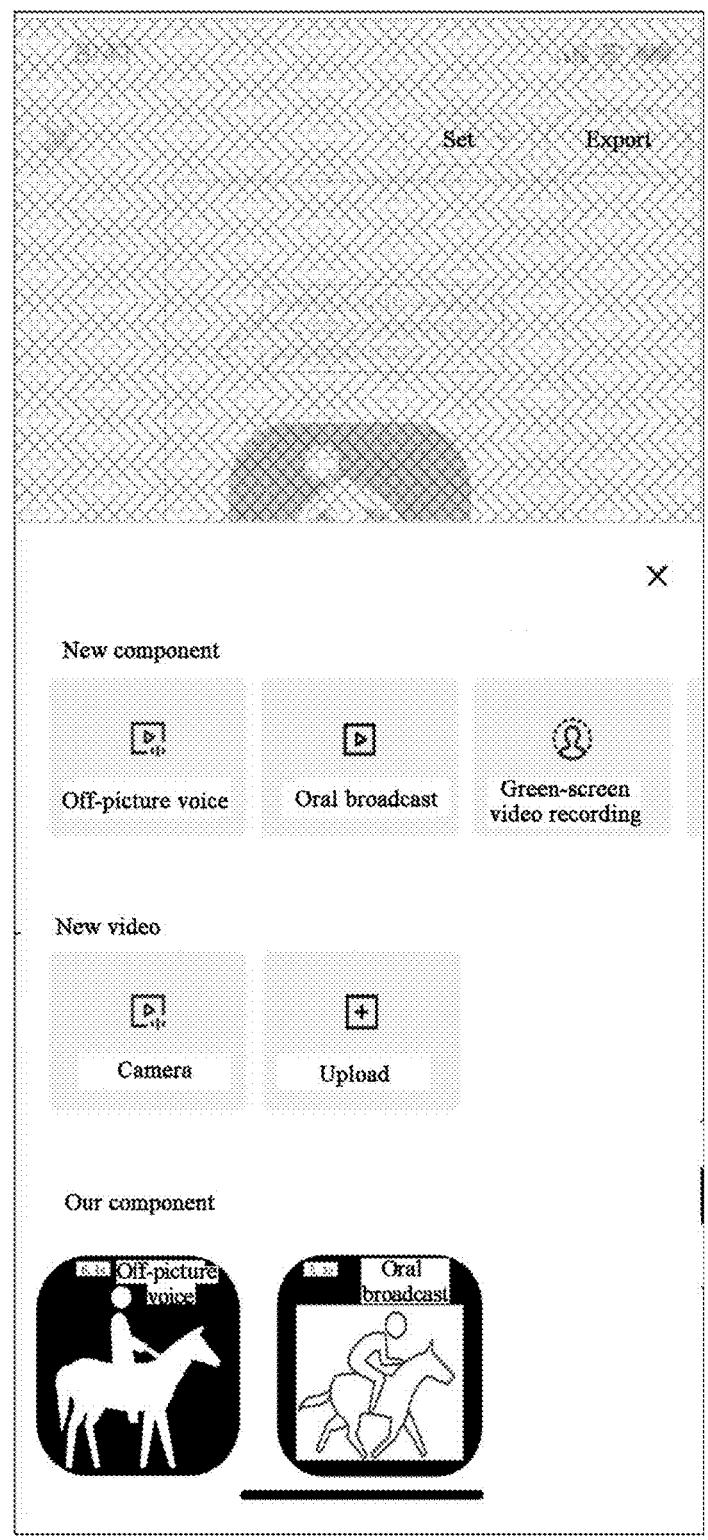
FIG. 9 is a schematic diagram of an editing mode selection window for editing a subtask after an add trigger control is clicked in an operation menu corresponding to an editing subtask provided by an embodiment of the present disclosure.

With reference to FIG. 9, after the addition trigger control in the subtask operation menu is clicked, an editing subtask editing mode selection window is displayed in a mask form on the editing interface of the video editing task. The editing subtask editing mode selection window is displayed but not limited to the editing modes of the following editing subtasks: editing modes such as off-picture voice, oral broadcast, green screen recording, direct recording by a camera, uploading a material from an album, etc. and selecting one of already saved editing modes corresponding to the video editing component in My Components. Each time the operation of adding an editing subtask is triggered, only one new editing subtask is allowed to be added and the identifier of the editing subtask is presented in the editing interface of the video editing task.

S540: in response to a first operation for triggering a target editing subtask, obtain an initial video material and present an editing interface of the target editing subtask, wherein an editing track is presented in the editing interface of the target editing subtask, a video track segment formed based on the initial video material is placed on a video editing track in the editing track, and at least one editing subtask comprises a target video editing subtask.

S550: in the editing process of the target editing subtask, recording the editing operation triggered in the editing interface and presenting an indication identifier of the editing operation in the editing track.

S560: in response to a second operation for confirming completion of the target editing subtask, generating an editing result of the target editing subtask based on the recorded information of the editing operation and the initial video material.

S570: generating a target video as an editing result of the video editing task, based on the editing result of each editing subtask of the video editing task; in the target video, the initial video material is presented according to the editing effect corresponding to the editing operation.

As an optional but non-limiting implementation, the generating a target video as an editing result of the video editing task, based on the editing result of each editing subtask of the video editing task may comprise the following:

determining a combination mode designated by an editing template, the combination mode being used for indicating to combine at least one editing subtask into the video editing task; synthesizing editing results of all editing subtasks of the video editing task according to the combination mode to obtain the target video.

With reference to FIG. 3, the editing interface of the video editing task displays the identifier of each editing subtask, namely, a video editing component corresponding to each editing subtask; an editing template of the video editing task specifies a combination mode between the editing subtasks; the combination mode of the editing subtasks is at least configured in a way that at least one editing subtask is concatenated and combined in an arrangement order into the video editing task. Optionally, the arrangement order of the at least one editing subtask is specifically an arrangement order of the identifier of the at least one editing subtask on the editing interface of the video editing task; the editing subtasks specified by the editing template are sorted in the arrangement order specified by the editing template. Optionally, if there are a plurality of video tracks on the editing interface of the editing subtask, in response to a splitting operation on the video track the split video tracks act as new editing subtasks.

As an optional but non-limiting implementation, the video editing method of the present embodiment may further comprise the following process: presenting a preview player on the editing interface of the video editing task, the preview player being used for preview playing a combination result of editing results of the editing subtasks of the video editing task.

Referring to the left diagram of FIG. 3, a preview player 140 is displayed on the editing interface of the video editing task; the preview player 140 may be used to perform preview playing on the combination result of the editing results of the editing subtasks of the video editing task on the editing interface of the video editing task. Optionally, upon playing through the preview player 140, an identifier of the editing subtask corresponding to the play may be selected on the editing interface of the video editing task, and a playing icon is displayed on the identifier of the selected editing subtask, and the playing icon is used for prompting that the editing result of the corresponding editing subtask is being played.

Referring to the left diagram of FIG. 3, a progress bar 120 is displayed on the editing interface of the video editing task, the progress bar 120 is displayed in segments according to different video outline groups, and the progress bar locates a video outline group to which a correspondingly played editing subtask belongs. When the preview player 140 is performing preview playing, the playing progress may be dragged by clicking the progress bar 120, and after the progress bar is released, the preview player 140 continues playing from the editing result of the editing subtask at the location of the progress bar, and meanwhile locates the corresponding identifier of the editing subtask. When the progress bar 120 is dragged, the title of the video outline corresponding to the progress bar is switched, without affecting the selection state of the identifier of the editing subtask; and when the progress bar is released, the identifier of the editing subtask corresponding to the picture played by the preview player 140 is located and selected.

With reference to the left diagram of FIG. 3, optionally, in response to a click operation on an identifier of an editing subtask on the editing interface of the video editing task, a video picture being played by the preview player 140 is paused; the video picture displayed after the pause of play is switched to a first frame of a video segment associated with the editing result of the editing subtask corresponding to the click operation. Optionally, after pausing the video being played by the preview player of the editing interface of the video editing task, the method further comprises: in response to an operation of triggering video play by the preview player of the editing interface of the video editing task, performing video playing on the preview player starting from the first frame of the video segment associated with the editing result of the editing subtask corresponding to the click operation. When a full-screen icon is click-triggered on the editing interface of the video editing task, the preview player of the editing interface of the video editing task enters full-screen preview playing.

Referring to the left diagram of FIG. 3, optionally, the video being played by the preview player of the editing interface of the video editing task is paused in response to an operation of slide-triggering an identifier of an editing subtask on the editing interface of the video editing task. Optionally, the subtask operation menu of the identifier of the editing subtask is synchronously displayed when the identifier of the editing subtask on the editing interface of the video editing task is selected.

Referring to the left diagram of FIG. 3, optionally, when the editing interface of the video editing task is closed, a video draft is automatically saved, and a prompt that the video draft is already saved is given upon returning to the previous page. An export control on the editing interface of video editing task is clicked to enter a video export flow. If there is the video content of the video editing component corresponding to the editing subtask in the original editing template which is not modified, a prompt that the video cannot be exported is given; if the identifier of the editing task is deleted empty, a prompt that the video cannot be exported is given. A setting control is clicked, an export setting panel is pulled up, a definition, for example 720p by default, is set on the setting panel; a switch is configured on the setting panel; regarding whether to simultaneously save the identifier of the editing subtask upon exporting, the function is closed by default; the setting button is clicked again to collect the panel and save the setting.

According to the technical solution of the solution of the present solution, a suitable editing template may be provided according to the needs of the video editing task, at least one editing subtask is created for the video editing task; in response to a first operation for triggering a target editing subtask, an initial video material is obtained and an editing interface of the target editing subtask is presented, and a video content frame to be edited and generated is visually embodied through each editing subtask created; in the editing process of the target editing subtask, the editing operation triggered in the editing interface is recorded and an indication identifier of the editing operation is presented in the editing track; the editing and generation of the whole video is split by using different editing subtasks, and the video editing is completed by the guidance of different editing subtasks, thereby simplifying the complexity of video editing. Furthermore, even though an editing error occurs in the editing process, the editing subtask where the error occurs may be re-edited, thereby improving the efficiency of video editing and generation.

As an optional but non-limiting implementation, obtaining the initial video material and presenting an editing interface of the target editing subtask comprises: selecting a displayed identifier of an editing subtask on the editing interface of the video editing task, the editing subtask having been pre-configured in the editing template when entering the editing interface of the video editing task; in response to an editing trigger operation on the identifier of the editing subtask, calling a material filling page of the editing subtask to obtain the initial video material, and presenting an editing interface of the target editing subtask according to the obtained initial video material.

Referring to FIG. 8, in response to a click operation on the identifier of any editing subtask, an identifier box of the editing subtask displayed on the editing interface of the video editing task and having received the click operation may be selected, wherein the identifier of the editing subtask selected by the click operation is pre-configured in the editing template upon entering the editing interface of the video editing task.

Figure 10:
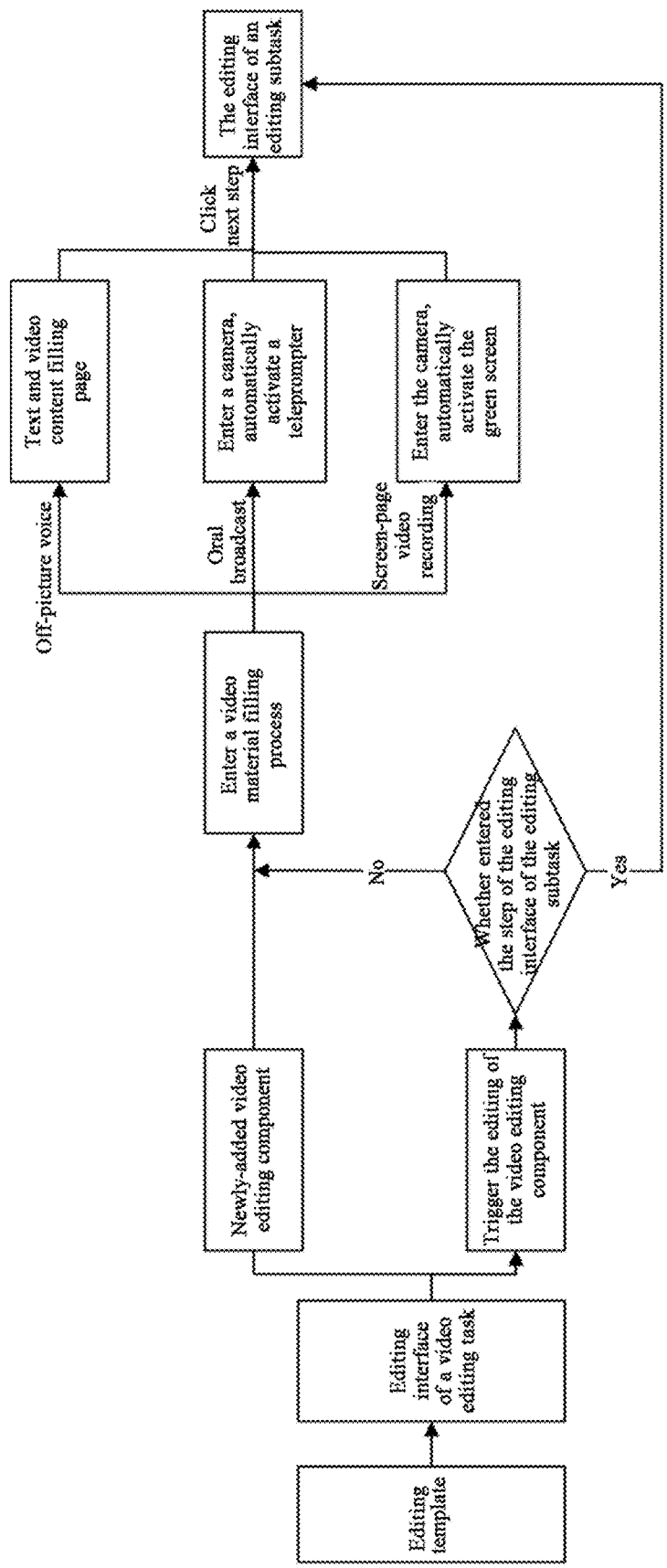
FIG. 10 is a general flow chart of a jump from an editing interface of a video editing task to an editing interface of an editing subtask provided by an embodiment of the present disclosure.

Referring to FIG. 10, when the identifier of the editing subtask selected by the click operation is already pre-configured in the editing template upon entering the editing interface of the video editing task instead of the identifier of the newly added editing subtask, a subtask operation menu of the selected editing subtask may be pulled up on the editing interface of the video editing task. After the subtask operation menu is pulled up, an editing control on the subtask operation menu is allowed to be triggered; in response to a click triggering operation on the editing control on the subtask operation menu, jump is made from the editing interface of the video editing task to a material filling page of the editing subtask. The acquisition of the initial video material may be achieved by the material filling page of the editing subtask.

As an optional but non-limiting implementation, obtaining the initial video material and presenting the editing interface of the target editing subtask comprises: in response to a click operation on an identifier of an editing subtask displayed on the editing interface of the video editing task, invoking the material filling page of the identifier of the editing subtask to obtain an initial video material, and presenting an editing interface of a target editing subtask according to the obtained initial video material; the editing subtask is a newly added editing subtask that is not configured in the editing template when entering the editing interface of the video editing task.

Referring to FIG. 10, when the identifier of the editing subtask selected by the click operation is the identifier of the newly-added editing subtask after entering the editing interface of the video editing task, in response to a click operation on the identifier of an editing subtask displayed on the editing interface of the video editing task, a jump is directly made from the editing interface of the video editing task to a material filling page of the editing subtask. The acquisition of the initial video material may be achieved by the material filling page of the editing subtask.

As an optional but non-limiting implementation, if the target editing subtask is an editing subtask in a first type, a speech track segment formed based on a speech material is placed on an audio track of an editing track of the editing interface corresponding to the target editing subtask. The speech material is an audio material obtained by performing speech synthesis on a reading text, for example, the audio material may be obtained by text-to-speech processing; or, the speech material is audio material recorded by an audio collector. Optionally, the target editing subtask is an editing subtask specified by the editing template used by the video editing task, and the reading text is obtained based on a first preset text specified by the editing template for the target editing subtask. The first preset text will be illustrated in detail below.

Figure 11:
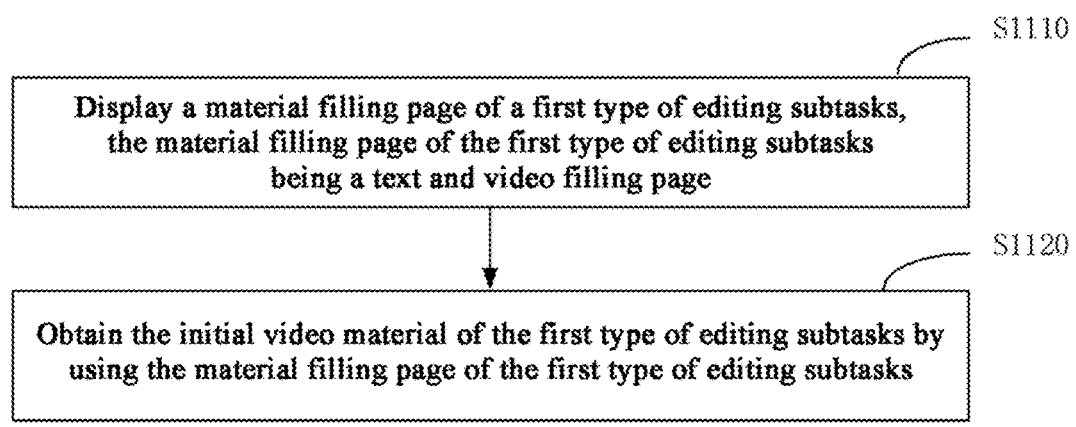
FIG. 11 is a flow chart of video editing in an editing subtask provided by an embodiment of the present disclosure.

As an optional but non-limiting implementation, referring to FIG. 11, obtaining the initial video material and presenting the editing interface of the target editing subtask comprises may include the following steps S1110-S1120:

S1110: displaying a material filling page of a first type of editing subtask, the material filling page of the first type of editing subtask being a text and video filling page.

With reference to FIG. 10, when the click-triggered first type of editing subtask is edited for the first time or exits from the material filling page of the first type of editing subtask last time, a jump occurs from the editing interface of the video editing task and the material filling page of the first type of editing subtask is displayed to enter a content filling flow. The first type of editing subtask may be an off-picture audio/video editing task.

Figure 12:
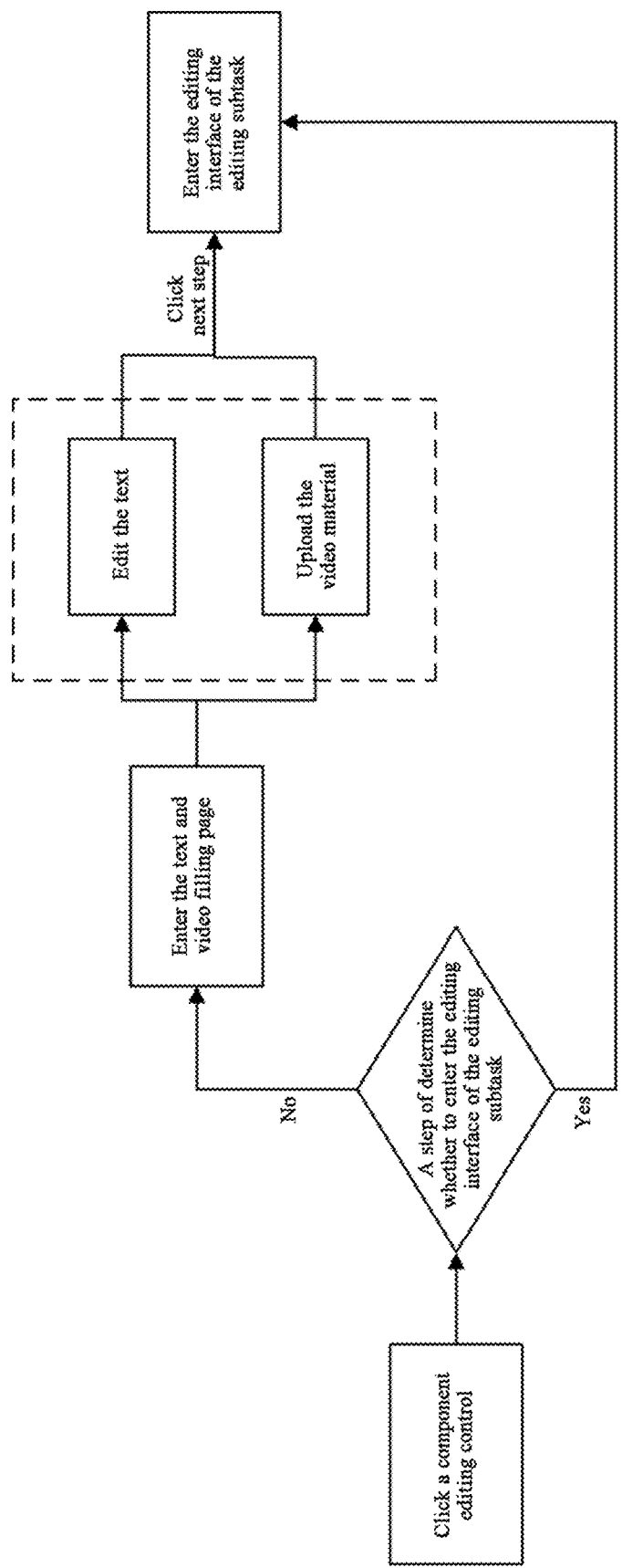
FIG. 12 is a flow chart of a jump from an editing interface of a video editing task to an editing interface of an editing subtask provided by an embodiment of the present disclosure.

Optionally, referring to FIG. 12, displaying a material fill page of a first type of editing subtask may include the following process: detecting whether the first type of editing subtask is edited for the first time or exits from the material filling page of the first type of editing subtask last time; if YES, directly jumping from the editing interface of the video editing task and displaying the material filling page of the first type of editing subtask; if NO, directly displaying the editing page of the first type of edit subtask.

S1120: obtaining the initial video material of the first type of editing subtask by using the material filling page of the first type of editing subtask.

Figure 13:
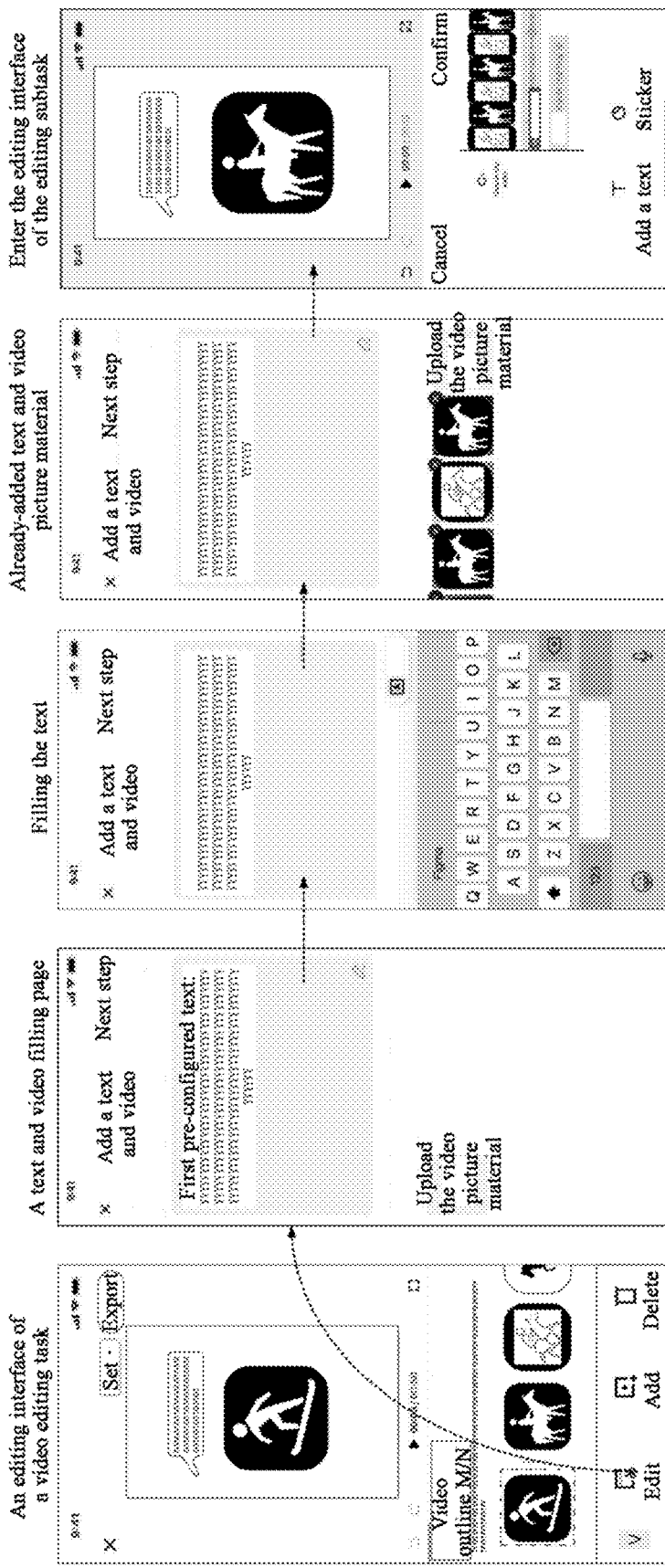
FIG. 13 is a schematic diagram showing interface transition in a jump from an editing interface of a video editing task to an editing interface of an editing subtask provided by an embodiment of the present disclosure.

Referring to FIG. 13, optionally, when the first type of editing subtask is an editing subtask specified in the editing template used by the video editing task, a material filling page of the first type of editing subtask displays a first preset text and prompt content for prompting the existence of the first preset text and supporting text editing on the basis of the first preset text; the above-mentioned reading text may be obtained by performing an editing operation on the basis of the first preset text specified by the editing template for the target editing subtask; and FIG. 13 shows an interface transition flow chart for obtaining the initial video material in the first type of editing subtask.

Optionally, a material filling page of the first type of editing subtask is provided with a text editing area, and the first preset text is presented in the text editing area; in response to the editing operation of the text editing area, a text within the text editing area after the editing operation is obtained as the read-out text.

Referring to FIG. 13, optionally, when the first type of editing subtask is not the editing subtask designated in the editing template used by the video editing task, but an editing subtask newly added on the editing interface of the video editing task, the material filling page of the first type of editing subtask displays prompt content for prompting that a self-defined editing text is being performed, and the material filling page of the first type of editing subtask does not display the first preset text.

Referring to FIG. 13, optionally, after the text is edited or the video picture material is input on the material filling page of the first type of editing subtask, the input text document and video picture material are saved by clicking a blank space or retracting a keyboard. A limit of the number of characters in the text document is set in the material filling page of the first type of editing subtask. If the number of characters in the input text document exceeds the limit, a window will pop up to prompt that the number of characters exceeds the limit upon saving the text document, and the content beyond the scope will be deleted.

With reference to FIG. 13, after the text document content and the video picture material are filled in the material filling page of the first type of the editing subtask, the filled text document content and video picture material are taken as the initial video material, and in response to an editing page triggering operation in the editing subtask of the material filling page of the first type of the editing subtask, an editing interface of the editing subtask is presented based on the initial video material.

Optionally, referring to the $4^{th}$ page to the $5^{th}$ page from left to right in FIG. 13, the text document in the obtained video material is converted into a speech, and the speech is filled to an audio track and/or a caption track of the editing track presented in the editing interface of the editing subtask; in response to an operation of uploading the video picture material on the material fill page of the first type of editing subtask, the video picture material is sequentially filled to a video track of the editing track presented in the editing interface of the editing subtask.

Figure 14:
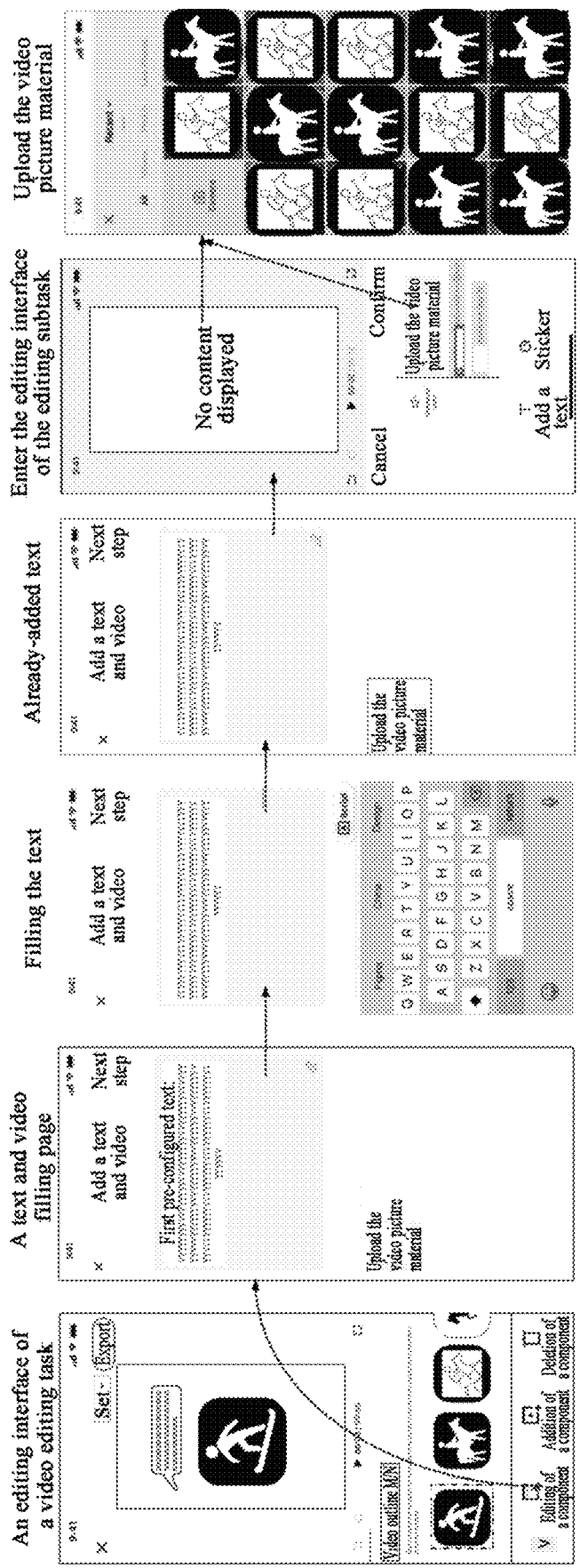
FIG. 14 is another schematic diagram showing interface transition in a jump from an editing interface of a video editing task to an editing interface of an editing subtask provided by an embodiment of the present disclosure.

Optionally, referring to the $4^{th}$ to $6^{th}$ pages from the left to the right in FIG. 14, the text document in the obtained video material is converted into a speech, and the speech is filled to an audio track and/or a caption track of the editing track presented in the editing interface of the editing subtask; a jump occurs from the material filling page of the first type of editing subtask to an editing interface of the first type of editing subtask; in response to an operation of uploading the video picture material at the editing interface of the first type of editing subtask, the editing interface of the editing subtask of the first type is employed to fill the uploaded picture material into the video track of the editing track presented in the editing interface of the editing subtask. In a case where the material filling page of the first type of editing subtask does not comprise video picture material, a video picture placeholder map is filled in the preview player area of the editing interface of the first type of editing subtask. The video picture placeholder map is not displayed on the video track. The video track or the picture placeholder map of the preview player area is clicked. The video picture material may be added using the editing interface of the first type of editing subtask.

Figure 15:
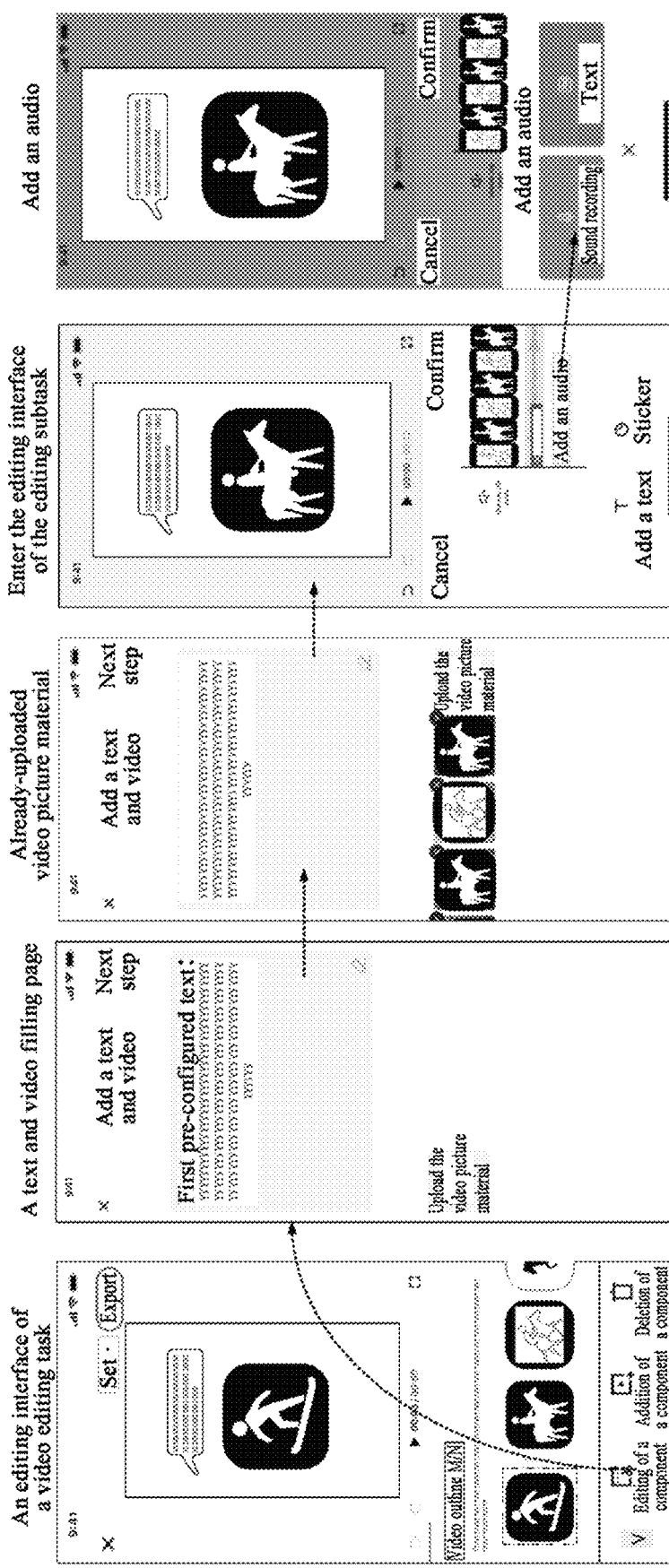
FIG. 15 is a further schematic diagram showing interface transition in a jump from an editing interface of a video editing task to an editing interface of an editing subtask provided by an embodiment of the present disclosure.

Optionally, referring to the $4^{th}$ to $5^{th}$ pages from left to right in FIG. 15, in response to an operation of uploading the video picture material at the material filling page of the first type of editing subtask, the material filling page of the first type of editing subtask is used to obtain the uploaded video picture material, and the video picture material is filled into the video track of the editing track presented in the editing interface of the editing subtask; a jump occurs from the material filling page of the first type of editing subtask to the editing interface of the first type of editing subtask; in response to an audio addition operation at the editing interface of the first type of editing subtask, the editing interface of the first type of editing subtask is employed to obtain the added audio and the audio is filled into the audio track of the editing track presented in the editing interface of the editing subtask. In a case where the material filling page of the first type of editing subtask does not comprise a text document material, the audio track of the editing interface of the first type of editing subtask is empty, and the audio track may be click to trigger adding a recorded audio or text.

As an optional but non-limiting implementation, a caption track segment formed based on the reading text is placed on a caption track of the editing track, the audio material is a reading audio of the reading text, and the caption track segment and the speech track segment have aligned time axis positions on the editing track.

As an optional but non-limiting implementation, when the first type of editing subtask is edited into the material filling page of the first type of editing subtask for the first time, a text document material in a document library is displayed in response to a document library view trigger operation on the material filling page of the first type of editing subtask. When text editing is performed on the material filling page of the first type editing subtask, switching to view the document library on the material filling page of the first type of editing subtask is supported. The content of the document library is displayed and sorted as follows: press Tab to display classes of the documents, for example, the documents may be classified according to types of the video outlines; document sorting logic: documents are sorted reversely according to labels and templates included in the documents, and similarity of labels included by the components. The similarity is defined as the number of the same labels of document labels and template labels (including the labels of the template layer and the component layer). If the document is given the tag ABCD and the template is given the tag CDE, the similarity is 2.

As an optional but non-limiting implementation, when the video picture material is uploaded on the material filling page of the first type of editing subtask or the editing interface of the first type of editing subtask, selection and uploading of a plurality of videos and picture materials is supported, and after selection, the video picture material is filled into the material filling page of the first type of editing subtask or the editing interface of the first type of editing subtask. The material filling page of the first type of editing subtask or the editing interface of the first type of editing subtask supports the deletion of the added video picture material.

Figure 16:
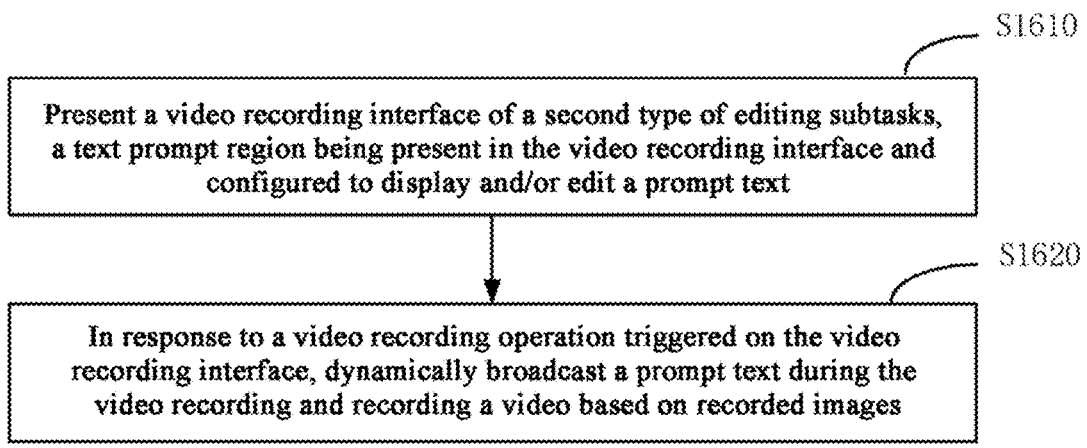
FIG. 16 is another flow chart of video editing in the editing subtask provided by an embodiment of the present disclosure.

As an optional but non-limiting implementation, with reference to FIG. 16, if the target editing subtask is a second type of editing subtask, the initial video material is a recorded video obtained by a camera. The video editing method of the present embodiment may also include but is not limited to the following steps S1610-S1620:

S1610: presenting a video recording interface of a second type of editing subtasks, a text prompt region being present in the video recording interface and configured to display and/or edit a prompt text.

The target editing subtask is an editing subtask specified by the editing template used by the video editing task, and the prompt text is obtained based on a second preset text specified by said editing template for the target editing subtask.

Figure 17:
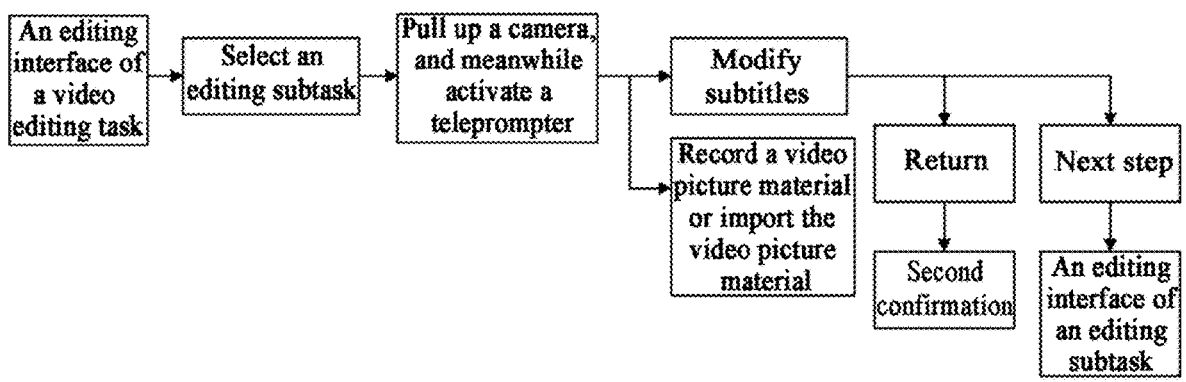
FIG. 17 is a further flow chart of a jump from an editing interface of a video editing task to an editing interface of an editing subtask provided by an embodiment of the present disclosure.

With reference to FIG. 17, optionally, the second type of editing subtask is an oral broadcast video editing task; in response to an editing trigger operation on the second type of editing subtask, detection is performed as to whether the second type of editing subtask is edited for the first time or exits from a video recording interface of the second type of editing subtask last time; if YES, a jump directly occurs from the editing interface of the video editing task to the video recording interface of the second type of editing subtask; if the second type of editing subtask is not edited for the first time or does not exit from the video recording interface of the second type of editing subtask last time, but exits from the editing interface of the second type of editing subtask last time, the editing interface of the second type of editing subtask is directly displayed.

S1620: in response to a video recording operation triggered on the video recording interface, dynamically broadcasting a prompt text during the video recording and recording a video based on recorded images.

Optionally, the video editing method of the present embodiment further comprises: presenting a second preset text in a text prompt region of the video recording interface; in response to an editing operation in the text prompt region, a text within the text prompt region after the editing operation is obtained as the prompt text.

With reference to FIG. 17, a teleprompter is configured in the text prompt area of the video recording interface of the second type of editing subtask, and the teleprompter is used for presenting and/or editing and prompting the second preset text for oral broadcast recording. In response to a video recording operation triggered on the video recording interface, a camera corresponding to the video recording interface is employed to record a video or upload the video to fill the video into the video track of the editing interface of the editing subtask.

Figure 18:
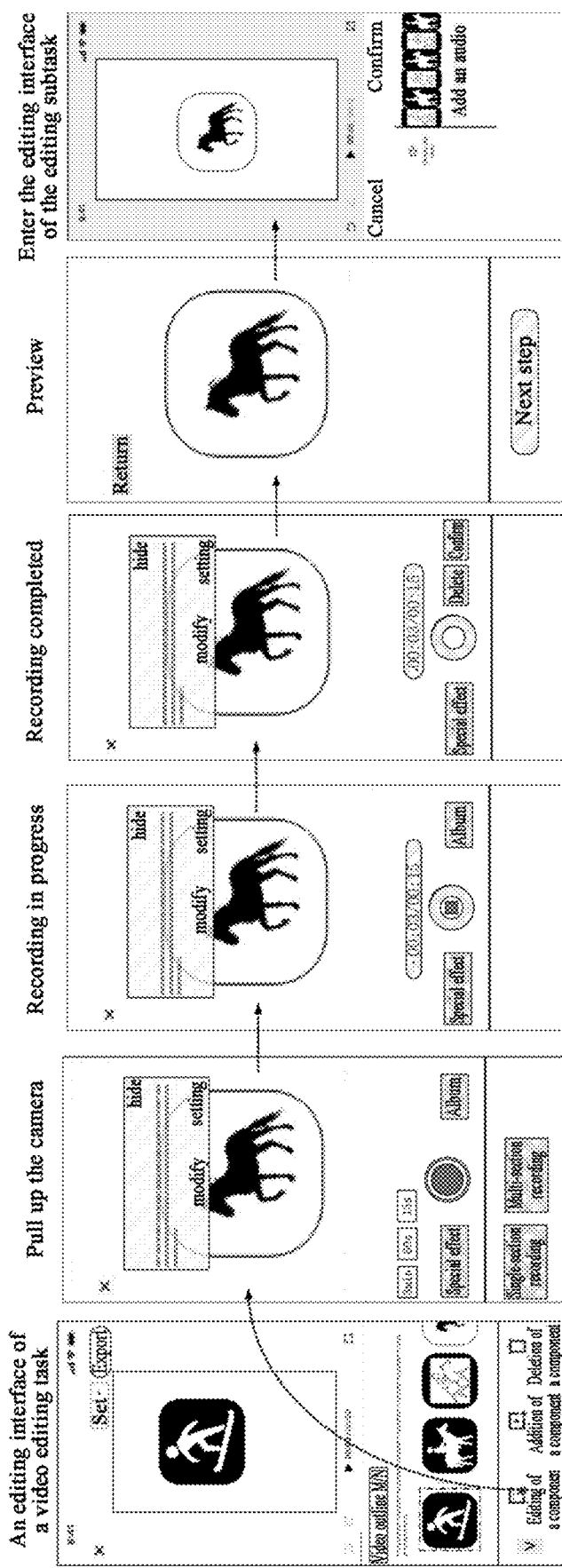
FIG. 18 is a further schematic diagram showing interface transition in a jump from an editing interface of a video editing task to an editing interface of an editing subtask provided by an embodiment of the present disclosure.

Referring to FIG. 17 and FIG. 18, upon entering the video recording interface of the second type of editing subtask, the video recording interface automatically pulls up the camera, and meanwhile the teleprompter is turned on in the text prompt region of the video recording interface, so that the second preset text on the teleprompter may assist in prompting while recording the video. The teleprompter may automatically fill a word-by-word script of the second type of editing subtask as subtitles. The subtitles in the teleprompter supports re-editing the second preset text displayed in a modified text prompt region.

Referring to FIG. 17 and FIG. 18, a recording control is configured on the video recording interface, and the camera is used to record a video picture material in response to a trigger operation of the recording control. Optionally, a special effect control and an album control are further configured on the video recording picture; in response to a special effect triggering operation, a special effect may be added to the recorded video picture material; in response to a triggering operation on the album control, the camera is employed to obtain the video picture material uploaded from the album. Optionally, a single-section recording control and a multi-section recording control are provided on the recording picture. A recording mode is selected by triggering the single-section recording control or multi-section recording control.

Referring to FIG. 17 and FIG. 18, after a confirmation control is triggered on the recording interface, the recorded video picture material may be preview-displayed; in response to a next triggering operation on the previewed video picture material, a jump occurs to display the editing interface of the second type of editing subtask. For example, after the recording of the video picture material is completed by the camera on the video recording interface, the editing interface of the second type of editing subtask is entered, and all the recorded or uploaded video picture materials are brought in, wherein a default time is 3 seconds after the photo materials are imported.

Referring to FIG. 18, a page element layout of the video recording interface corresponding to the camera comprises a right functional area (temporarily not shown in FIG. 18), a main operation area, and return logic. The right functional area comprises a front/rear camera turnover control, a filter control, a timing control, a flash light control and a teleprompter control. The front/rear cameras are turned over, the last selection is reserved by default, and the front camera is used upon first entry; for the timing, cancel/3 seconds/7 seconds may be selected, the second type of editing subtask is to 3 seconds by default, and a countdown is not set for the other editing subtasks; the flash light is turned off by default; the teleprompter is turned on by default for the second type of editing subtask, and turned off by default for other editing subtasks, and the teleprompter supports the prompt of the document library upon editing. The main operating area comprises: a special effect/green screen control, a recording control and an uploading control. The recording control is clicked to start recording in 16:9 vertical screen size, 720p by default; the uploading control is clicked to enter a process of importing materials from the album; after at least one piece of material has been recorded, click Next to enter the track editing page. Regarding the return logic control, when a closing control in the upper left corner of the recording interface corresponding to the camera is clicked, after the subtitles in the teleprompter are modified or at least one piece of material is recorded, a window pops up after the closing control is clicked, a selection may be made to discard the control/restart the control; after discarding the control is selected, the editing subtask will be considered as an unmodified state. If an editing subtask is newly created, the video editing task shows an empty editing subtask; after Restart is clicked, the previously recorded video segment is discarded, and recording is restarted.

Optionally, enter the album, and all albums of the system are displayed on the top, the first layer means choosing to enter the closest album by default, and the second layer means screening for types of materials, all/video/photos/live photos respectively; selection of plural materials is supported, mixed selection of various materials is supported, and the materials are displayed on the bottom in the selection order; click the selected album materials below or the materials themselves in the album area to enter the material preview page. For video-type materials, coarse clipping of the materials is supported; recording and importing the materials is supported, and click and then enter the camera process; after import is confirmed, the coarsely clipped materials are imported into the track in an order, wherein a duration of 3 seconds is set for photos by default.

As an optional but non-limiting implementation, if the target editing subtask is a third type of editing subtask, the initial video material at least comprises a first video material and a second video material, an image of the first video material and an image of the second video material are synthesized according to a designated concatenation layout into an image of a third video material, and a video track segment formed based on the image of the third video material is placed on the video editing track in the editing track. The target editing subtask is an editing subtask specified by an editing template used by the video editing task.

Figure 19:
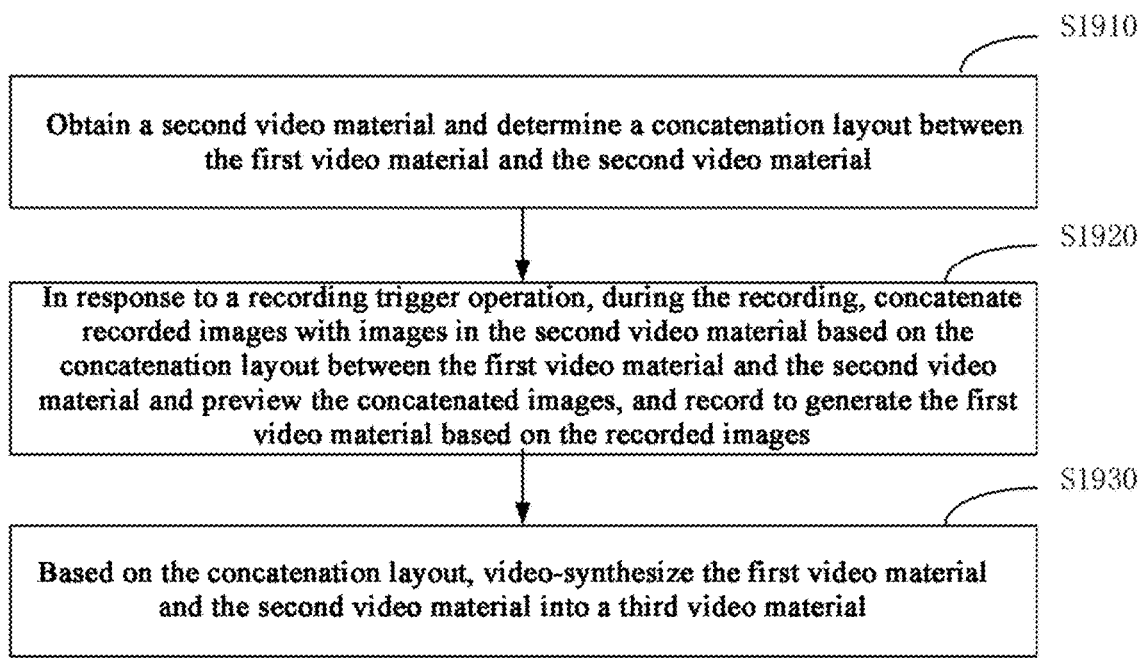
FIG. 19 is a further flow chart of video editing in an editing subtask provided by an embodiment of the present disclosure.

As an optional but non-limiting implementation, referring to FIG. 19, the video editing method of the present embodiment may further include, but is not limited to, the following steps S1910-S1930:

S1910: obtaining a second video material and determining a concatenation layout between the first video material and the second video material.

Optionally, a recording interface of a third type of editing subtask is presented, and in response to an operation of obtaining the second video material triggered on the recording interface, the second video material is obtained and the concatenation layout of the first video material and the second video material is determined.

Figure 20:
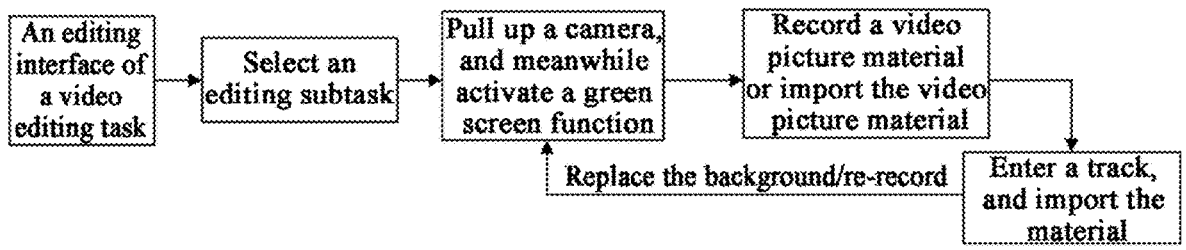
FIG. 20 is a further flow chart of a jump from an editing interface of a video editing task to an editing interface of an editing subtask provided by an embodiment of the present disclosure.
Figure 21:
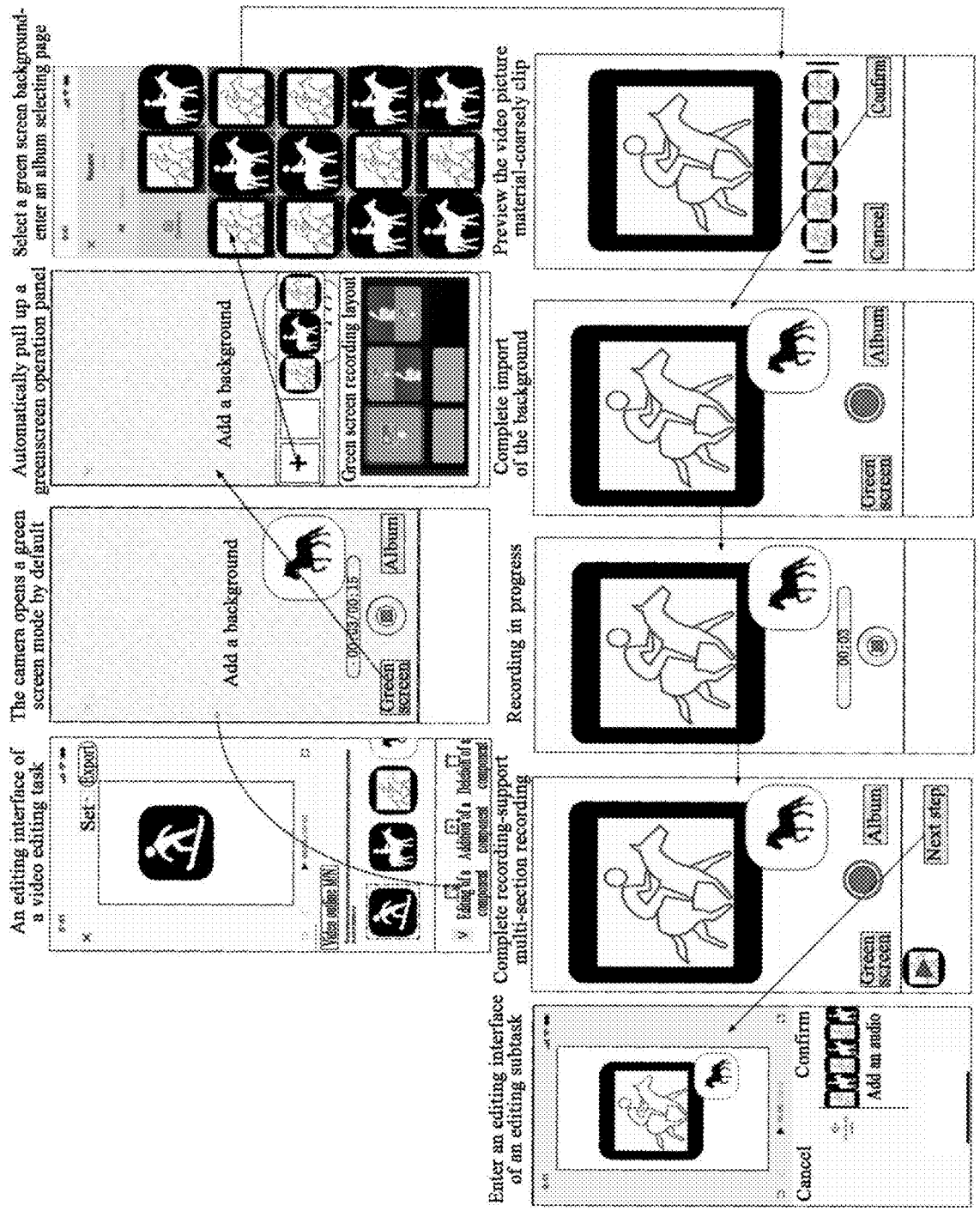
FIG. 21 is a further schematic diagram showing interface transition in a jump from an editing interface of a video editing task to an editing interface of an editing subtask provided by an embodiment of the present disclosure.

Referring to FIG. 20 and FIG. 21, in response to an editing trigger operation on the third type of editing subtask, detection is performed as to whether the third type of editing subtask is edited for the first time or exits from a video recording interface of the third type of editing subtask last time; if YES, a jump directly occurs from the editing interface of the video editing task to the video recording interface of the third type of editing subtask; if NO, the editing interface of the third type of editing subtask is directly displayed.

The green screen mode is activated by default on the recording interface of the third type of editing subtask, and a background of the recording interface is a green screen placeholder picture by default. After a second video material acquisition operation is triggered on the recording interface, the second video material is obtained, and the green screen placeholder picture in the recording interface of the third type of editing subtask is replaced with the second video material.

Referring to FIG. 21, the camera is automatically pulled up upon entering the video recording interface, and the green screen mode is turned on by default, and the green screen operation panel is automatically pulled up in response to a trigger operation of the green screen control at the video recording interface. The green screen operation panel allows for selecting a green screen background material, entering an album selection page and importing the background material as the second video material. The album selection page may display the video picture materials in the album in a reverse chronological order. The album selection page only supports checking the video picture material, and the video picture material only supports single selection; after the material is selected, a coarse clipping page is entered, and after confirmation, the material is imported into the camera, and the video recording interface for importing the background material is displayed.

Referring to FIG. 21, a control for configuring a layout between the background and the recorded content of the camera is displayed in the green screen operation panel. Three layout modes may be selected: matting, background on top of the content recorded by the camera, and background below the content recorded by the camera. Choosing to disable the green screen layout is supported. The matting is selected by default upon entry for the first time.

S1920: in response to a recording trigger operation, during the recording, concatenating a recorded image with an image in the second video material based on the concatenation layout between the first video material and the second video material and previewing the concatenated image, and recording to generate the first video material based on the recorded images.

Optionally, in response to a recording operation triggered on the recording interface, recording image acquisition may be performed during the recording, and meanwhile, a recorded image is concatenated with an image in the second video material based on the concatenation layout on the recording interface, and thereby the recorded images are recorded to generate the first video material.

Referring to FIG. 21, optionally, in response to a background replacement operation at the recording interface of the third type of editing subtask, the obtained second video material is used to replace the original green screen placeholder picture. After the camera is pulled up after entering the video recording interface (namely, the green screen video recording interface) of the third type of editing subtask, the original green screen placeholder picture of the video recording interface of the third type of editing subtask may be replaced with the second video material obtained right after the addition of the background material. After the background of the recording interface of the third type of editing subtask is imported into the second video material, in response to triggering a recording operation on the recording interface, image acquisition may be performed by the camera; while recording, the recorded image is concatenated with the image in the second video material according to the concatenation layout and the concatenated image is displayed on the recording interface for preview. Subsequently, the recorded image may be recorded to obtain the first video material.

Figure 22:
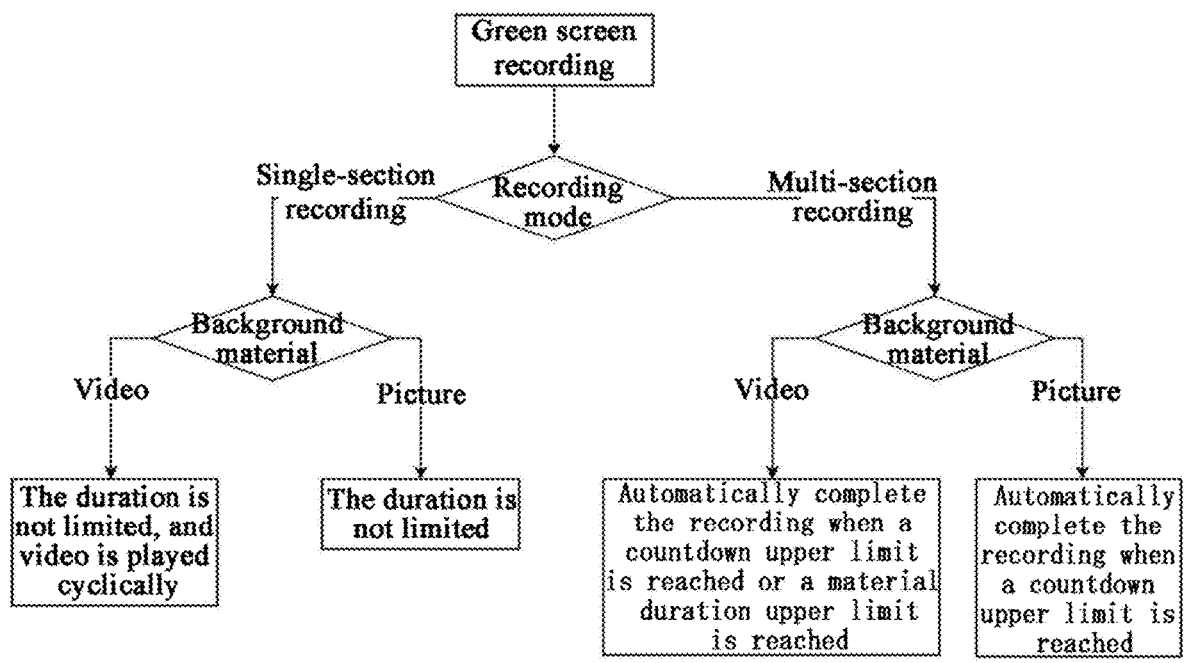
FIG. 22 is a flow chart of recording a video using a pulled-up camera on a recording interface according to an embodiment of the present disclosure.

As an optional but non-limiting implementation, referring to FIG. 21 and FIG. 22, the camera may support a single-section recording mode and a multi-section recording mode during use of the camera pulled up on the recording interface for recording. The single-section recording mode is as follows: if the uploaded background is a video, manually stopping recording or completing playing when the recording reaches a duration of the video, and entering a recording preview page; if the uploaded background is a photo, the recording duration is not limited, and completing the playing after manually stopping recording, and entering the recording preview page; the multi-section recording mode is as follows: if the uploaded background is a video, automatically completing the playing when the recording reaches a countdown duration or a video duration (a shorter duration), and entering the recoding preview page. Midway manual pause is supported, the switching of the background material is supported after the pause; no matter whether to switch, the material begins to be played from the start upon continuing to record. If the uploaded background is a photo, automatically completing the play when the recording reaches the countdown duration, and then entering the recording preview page. Dragging and zooming the foreground and background are all supported before and during the recording.

S1930: based on the concatenation layout, video-synthesizing the first video material and the second video material into a third video material Optionally, based on the concatenation layout of the first video material and the second video material, the first video material and the second video material are video-synthesized to generate the third video material so that at least part of the third video material is clipped as the video track segment.

With reference to FIG. 21, after the first video material and the second video material are obtained at the video recording interface of the third type of editing subtask, video syntheses processing is performed according to the layout mode of the first video material and the second video material to obtain the third video material, and at least partial video is clipped from the third video material and filled into the video editing track in the editing track of the editing interface of the third type of editing subtask. A playing area of the video picture supports dragging, and zooming the foreground and background.

Figure 23:
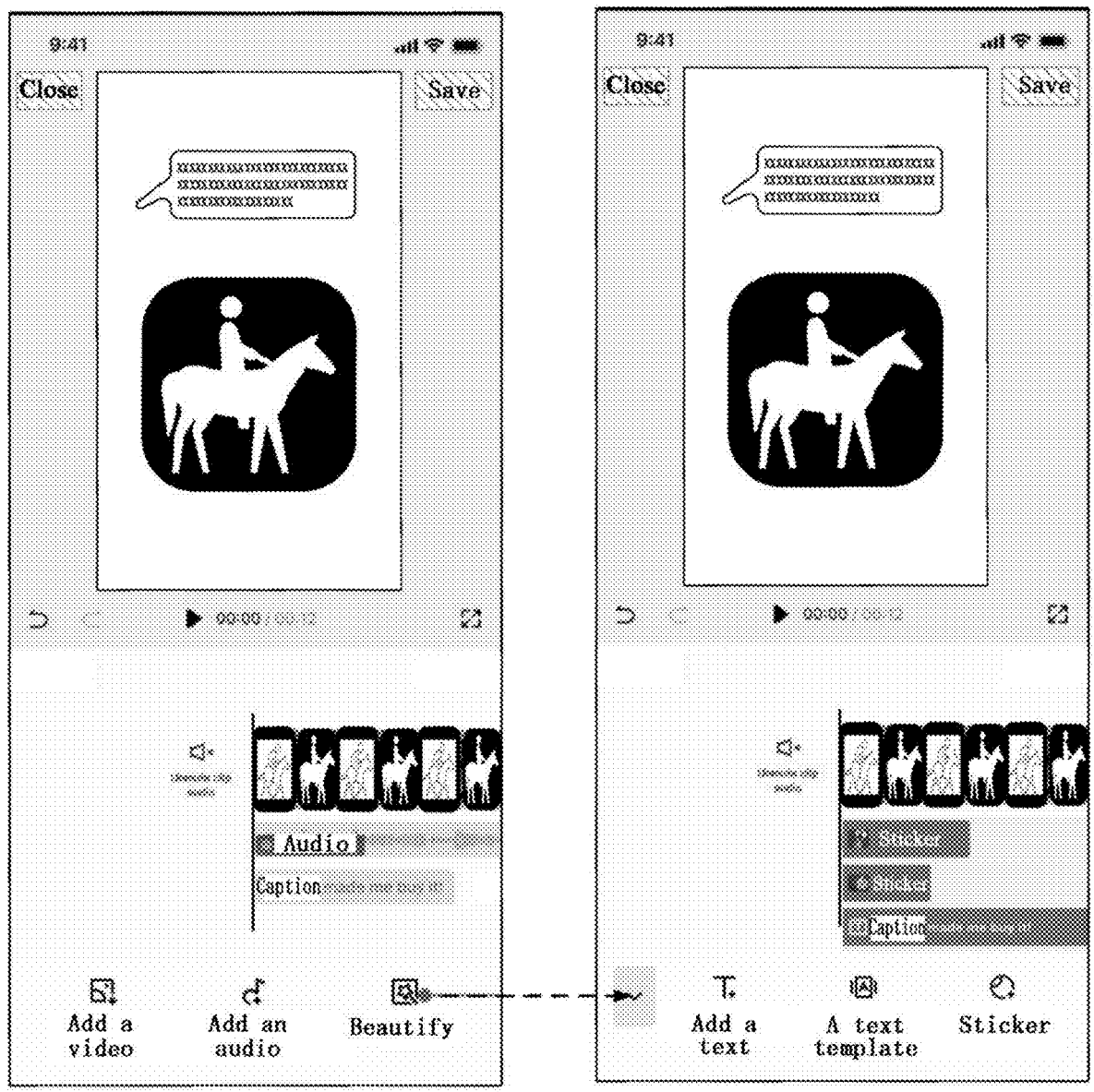
FIG. 23 is a schematic diagram of an editing interface for an editing subtask provided by an embodiment of the present disclosure.

As an optional but non-limiting implementation, referring to FIG. 23, regarding the editing interface of the editing subtask, the editing interface is provided with a preview area, a preview player is provided on the preview area, and video preview playing is performed or preview playing is paused by clicking a play control of the preview player. Optionally, the editing interface is provided with a page closing control. After the closing control is clicked, a window pops up to confirm whether to save the amendment; after confirm is clicked, the amendment is saved, and the process returns to the previous page; if cancel is clicked, the amendment is not saved, and the process returns to the previous page. Optionally, the editing interface is provided with a full-screen preview control supporting full-screen preview, and the editing interface is provided with a withdraw control supporting the withdrawal of the editing operation or a restore control supporting the restoration of the editing operation.

As an optional but non-limiting implementation, referring to FIG. 23, at most three tracks are supported on the editing interface of the editing subtask, and include a picture track, an audio track and a caption track; the picture track is filled with a video picture material, the audio track is filled with speech converted from the text or recorded speech, and the caption track is filled with the text. The caption track will not be presented if there is no caption.

As an optional but non-limiting implementation, referring to FIG. 23, the editing interface of the editing subtask is provided with a beautifying control; when the beautifying control is triggered by clicking, a beautifying menu panel is opened and displayed; a text adding control, a text template control and a sticker control are provided on the beautifying menu panel. By clicking and triggering the text adding control, the text template control and the sticker control, the selected audio track and caption track may be hidden, and the stickers, the character template and a flower track may be displayed.

Referring to FIG. 23, the text adding control is clicked and triggered, the character panel and the keyboard are pulled up, charters are added, the character track is added at the time axis after the addition, in 3 seconds by default. The characters are edited; after the characters are added, the characters cover the picture track in the form of a mask layer in 3 seconds by default; the clipping of character duration is supported; the text adding control is clicked and triggered to add characters, or the text editing panel is awakened by clicking a certain text/caption in the picture.

Referring to FIG. 23, the text template control is clicked and triggered, and a character template panel is pulled up. The character template panel is as follows: pull the background text template panel, first pull the classification, and then pull the character template under the classification. A character template track is added at time axis after the addition, in 3 seconds by default. The character templates are displayed sequentially according to the time sequence, and it is necessary to check whether the character templates have preset labels.

Figure 25:
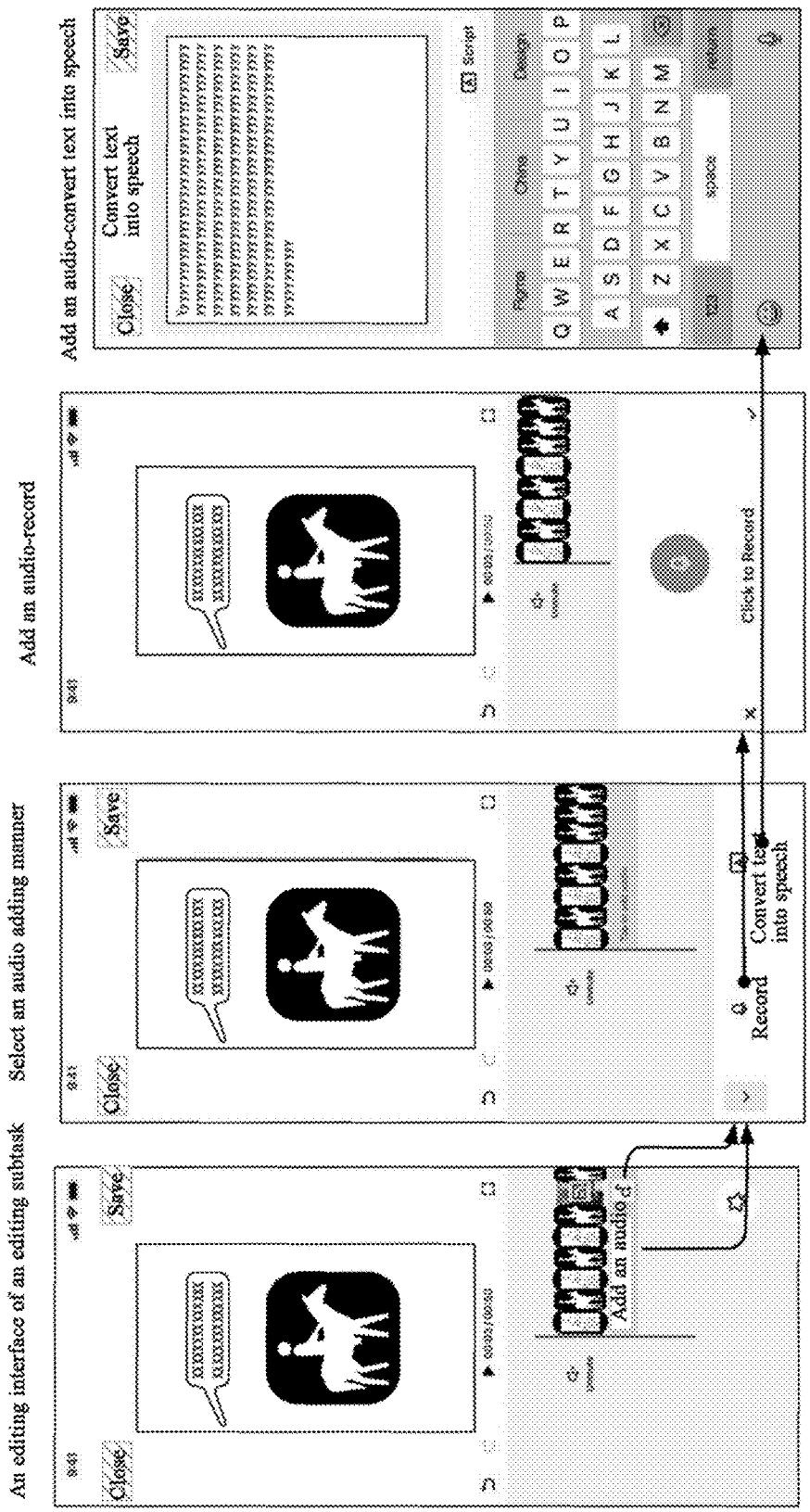
FIG. 25 is a schematic diagram showing interface transition in adding an audio in an editing interface of an editing subtask provided by an embodiment of the present disclosure.

As an optional but non-limiting implementation, referring to FIG. 25, in response to a triggering operation of an audio adding control or a blank audio track in the editing interface of the editing subtask, a secondary menu is pulled up, and an audio recording function is triggered to record an audio and input the audio to the audio track in response to an audio recording triggering operation of the secondary menu; or, in response to a text-to-speech operation of the secondary menu, a text-to-speech function is triggered to input the text and then convert the text to the speech and fill the speech into the audio track. If the audio track already has a recorded audio, the audio resulting from the text-to-speech conversion may not be added, and the option of the text-to-speech conversion control is grayed out to be unavailable; if there is an audio resulting from text-to-speech conversion in the audio track, the audio generated by audio recording may no longer be added, and the option of audio recording control is grayed out to be unavailable.

Optionally, with reference to FIG. 25, clicking a video addition control of the audio track in the editing interface of the editing subtask or selecting the audio track and clicking the video addition control popped up in the editing interface of the editing subtask, a prompt is given to select whether an audio addition manner is a recorded audio or an audio resulting from the text-to-speech conversion. When the audio resulting from the text-to-speech conversion is selected, a document editing page is pulled up and the document is filled; after the filling of the document is completed, save is clicked and then after completion of the saving, a text-to-speech TTS audio and caption are generated automatically. When the recorded audio is selected, the audio recording panel is pulled up, the audio recording control is clicked, the audio recording is started, and if the audio recording control is clicked again, the recording is paused; if the close control is selected, the recording is cancelled, and if the save control is selected, the recording is completed.

Figure 26:
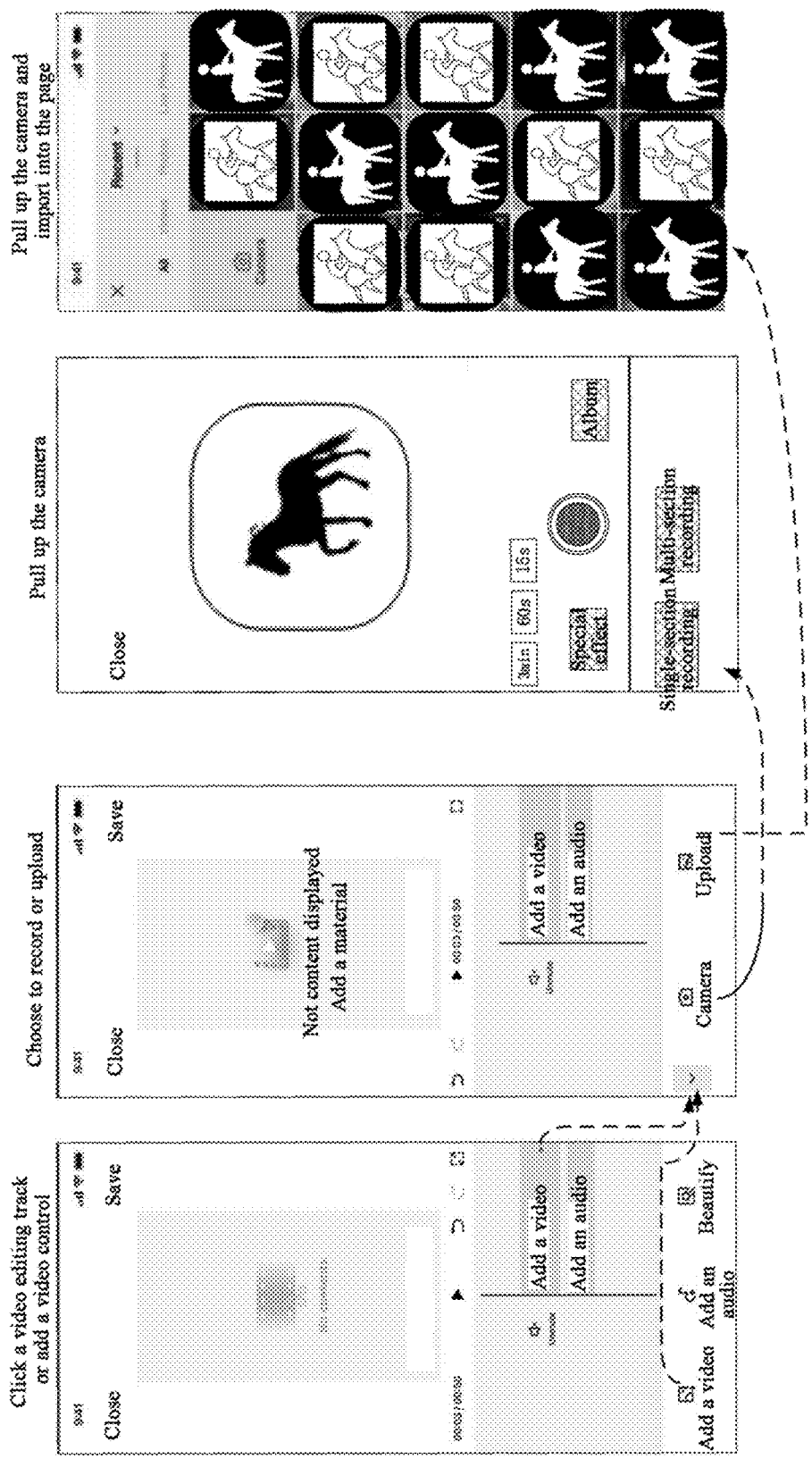
FIG. 26 is another schematic diagram showing interface transition in adding an audio in an editing interface of an editing subtask provided by an embodiment of the present disclosure.

As an optional but non-limiting implementation, with reference to FIG. 26, in response to a triggering operation of the video addition control or the video track in the editing interface of the editing subtask, the secondary menu is pulled up, and in response to a video addition triggering operation of the secondary menu, a choice is made to record or upload; after record is selected, the camera is pulled up to record the video picture material; reference may be made to the above for details; after the upload is selected, an album import page is pulled up to upload the video picture material. Reference may be made to the above for details. When pictures are added, a filling duration is 3 seconds by default. When the video is added, filling is performed according to the initial video duration.

Figure 24:
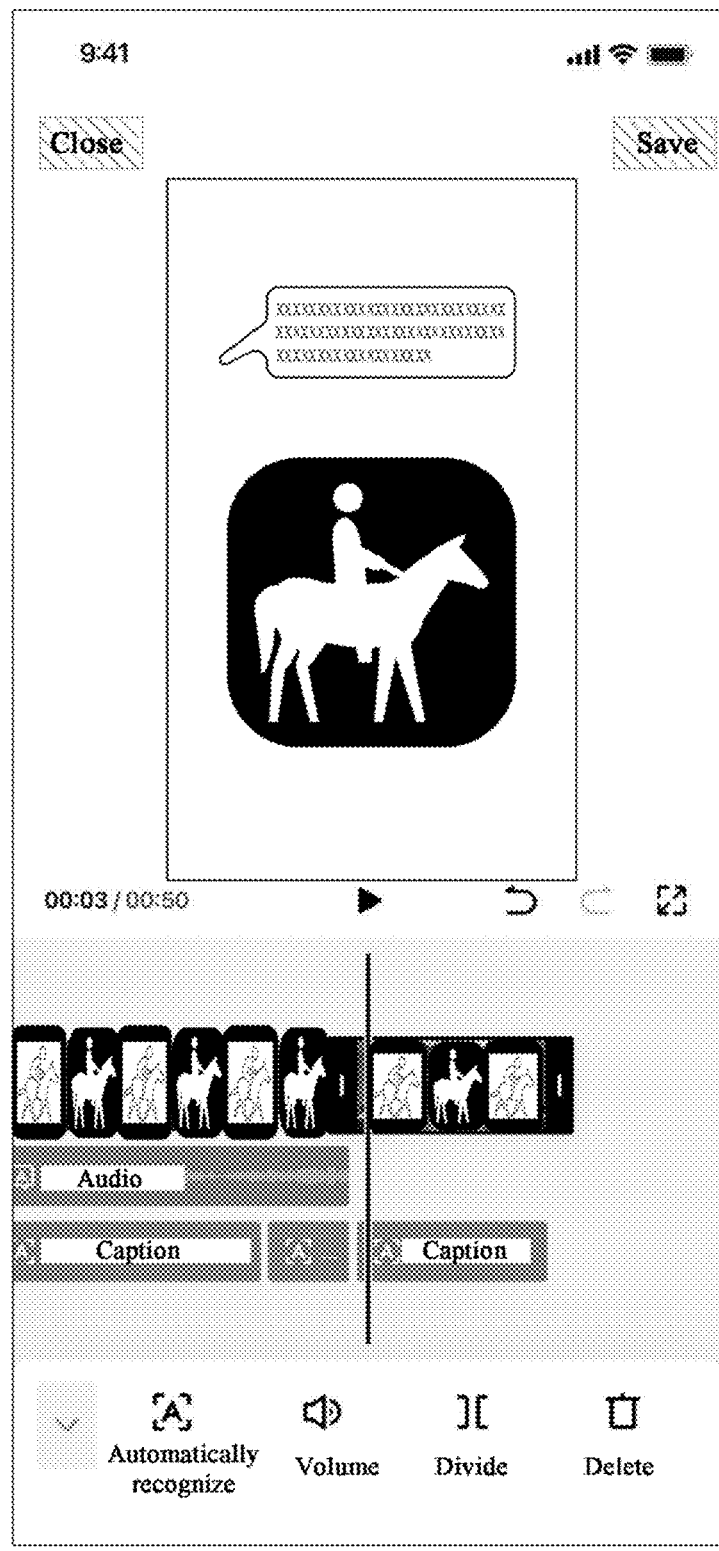
FIG. 24 is a schematic diagram of an editing interface for another editing subtask provided by an embodiment of the present disclosure.

As an optional but non-limiting implementation, with reference to FIG. 24, a video segment awakening operation on the video track is selected, a video segment box on the video track is dragged, and a duration of the video segment may be clipped. In response to an operation of triggering an automatic recognition control, caption is recognized according to the original sound of the selected video segment. In response to an operation of triggering a segmentation control, a segmentation line is pulled up to segment the video segment. Volume adjustment is made to the selected video segments in response to an operation of triggering a volume control. In response to an operation of triggering a deletion control, the selected video segment is deleted, and a video segment and caption immediately following the video segment is automatically attracted and moved forward; meanwhile, the caption generated according to the picture is also deleted together.

As an optional but non-limiting implementation, referring to FIG. 24, regarding editing interface of the editing subtask, a blank space of a canvas is clicked/a video track is selected by clicking, the canvas and the track are selected, zooming to adjust a picture size and rotation are supported; the caption on the canvas may be directly clicked, and be box-selected to enter the caption editing state.

Figure 27:
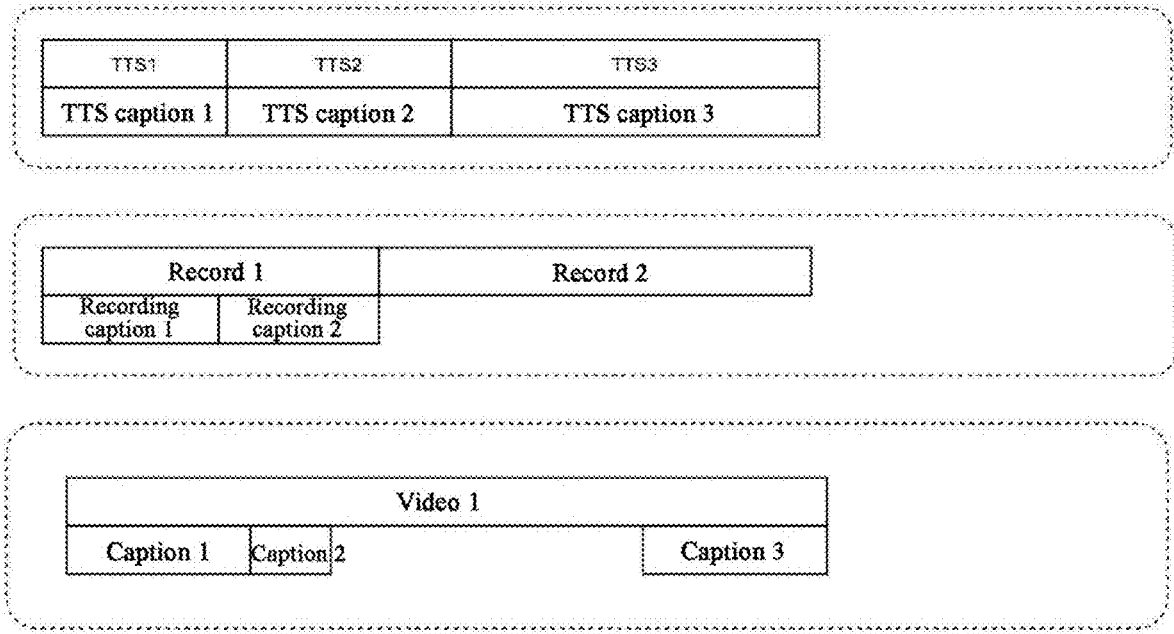
FIG. 27 is a schematic diagram showing the binding of an audio and a caption generated by the audio provided by an embodiment of the present disclosure.

As an optional but non-limiting implementation, referring to FIG. 27, for the editing interface of the editing subtask, only one audio type can exist simultaneously on the audio track, e.g., only one type of the audio resulting from the text-to-speech conversion and recorded audio can exist simultaneously on the audio track. As for the audio track that already has the audio resulting from the text-to-speech conversion, the audio resulting from the text-to-speech conversion can only be added; as for the audio track that already has the recorded audio, only a recorded audio can be further added, and the audio resulting from the text-to-speech conversion cannot be added.

As an optional but non-limiting implementation, referring to FIG. 27, for the editing interface of the editing subtask, the binding relationship between the audio and audio-generated caption is as follows: clicking the audio/caption so that the audio and the caption are selected at the same time and move together; when the video caption exists on the track, only audio is pushed, and the caption is not pushed; the audio and the caption may be adjusted in duration respectively; the duration of the caption cannot exceed the duration of the corresponding audio; when the duration of the audio is cut short, the caption is cut short at the same time; if when the audio is lengthened again, the caption content is restored; when the text-to-speech (TTS) is deleted/modified, an inquiry is made as to whether to delete/modify the corresponding caption; if YES, the caption is updated; when the recorded audio is deleted, an inquiry is made as to whether to delete the corresponding caption; if YES, the caption is deleted; when the caption of the text-to-speech TTS is deleted, an inquiry is made as to whether to modify the corresponding TTS; if YES, the audio is updated.

As an optional but non-limiting implementation, referring to FIG. 27, for the editing interface of the editing subtask, the binding relationship between the video and the video-generated caption is as follows: when a video is moved, a caption in a video time range is also moved therewith (the caption start time is in the video time range), and the caption cannot be moved alone; the caption may be moved individually, and when it is out of the video time range, the binding between the caption and the video is unbound; the video and the caption may be adjusted respectively in duration; deleting the caption does not affect the video; when the video is deleted, the caption within the video time range is also deleted.

Figure 28:
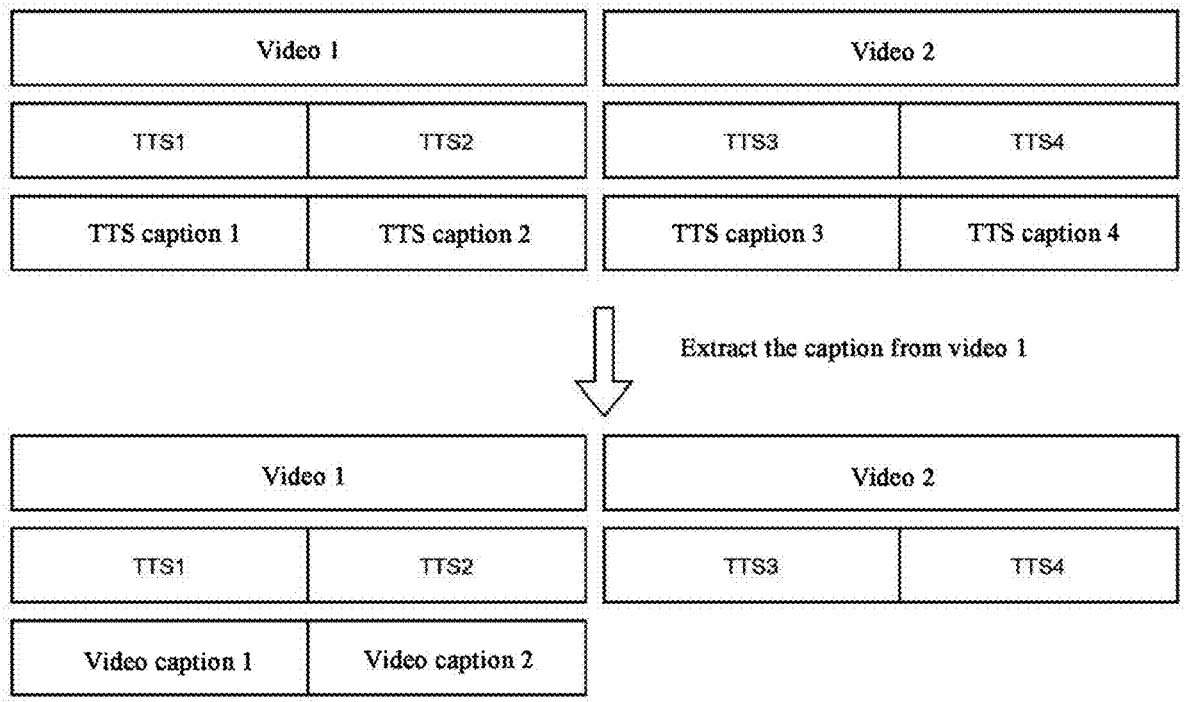
FIG. 28 is a schematic diagram of extracting video captions provided by an embodiment of the present disclosure.

As an optional but non-limiting implementation, referring to FIG. 28, for the editing interface of the editing subtask, sources of the caption are the audio and video and respectively have an icon label, the audio caption and video caption cannot exist at the same time, and a prompt that they need to be overwritten is given when they are added. When the video caption is extracted, all captions on the current track are deleted, and the video caption of the current segment is extracted.

Optionally, when the audio caption already exists, the video caption is extracted, and a prompt is triggered: there is already the audio caption currently, the newly-added video caption will overwrite all audio captions, and a determination is made as to whether to continue; if YES, a new caption is generated to overwrite the original caption. Optionally, when the video caption already exists, the recorded audio caption is extracted, and a prompt is triggered: there is already the video caption currently, the newly-added recorded audio caption will overwrite all video captions, and a determination is made as to whether to continue; if YES, a new caption is generated to overwrite the original caption. Optionally, the TTS is added when there is already the video caption, and a prompt is given: there is already the video caption currently, the newly-added Text-to-Speech caption will be automatically generated to overwrite the initial video caption, and a determination is made as to whether to continue; if YES, a new caption is generated to overwrite the original caption.

Figure 29:
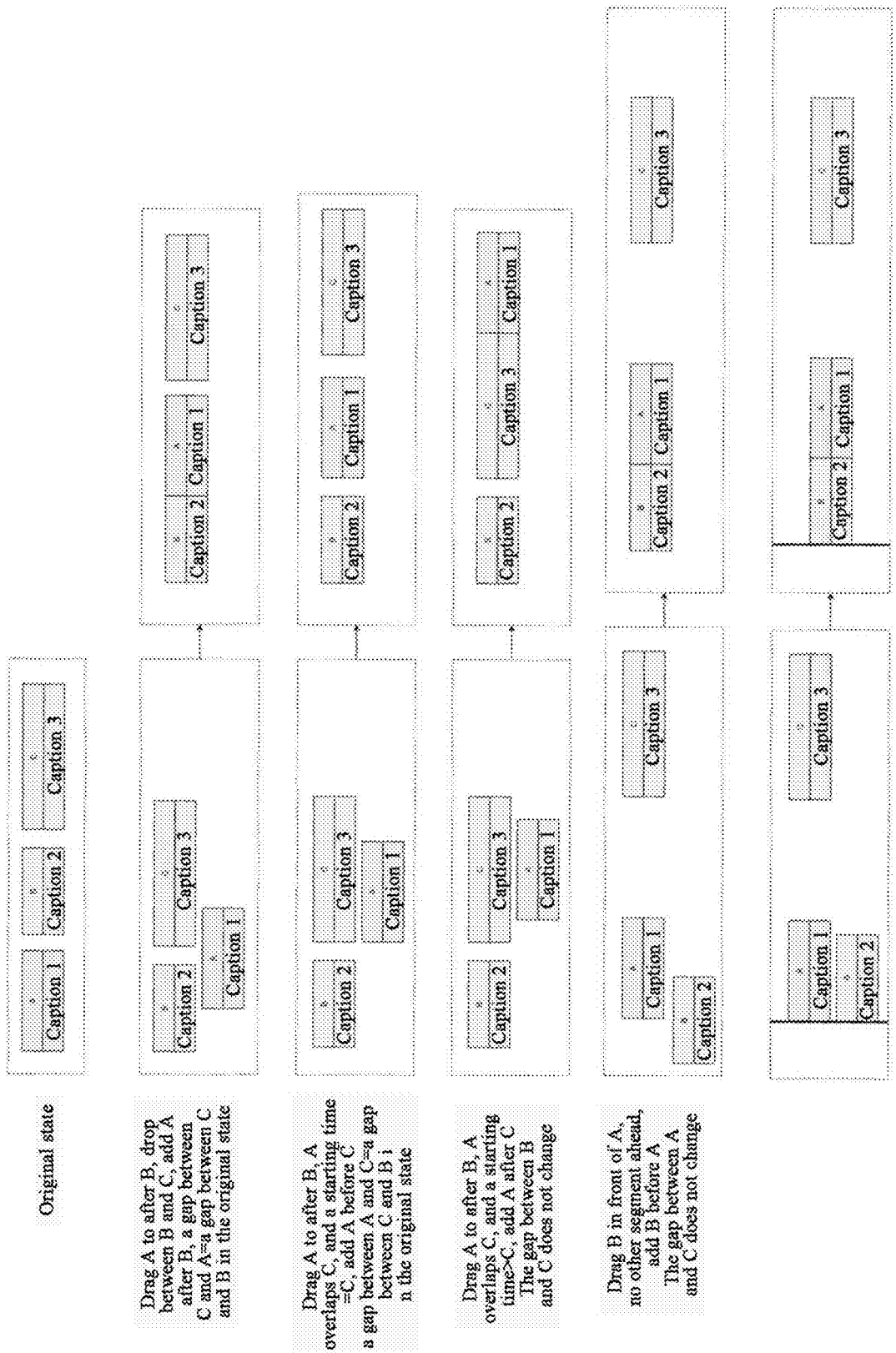
FIG. 29 is a schematic diagram showing logic between a moving caption and an audio provided by an embodiment of the present disclosure.

As an optional but non-limiting implementation, referring to FIG. 29, with regard to the editing interface of the editing subtask, when the audio/caption is moved, if there is the audio/caption in the target position, the movement is still supported, and the right audio and the caption corresponding to the audio are moved rightward. The movement logic of the video and video caption is kept consistent with engineering.

Figure 30:
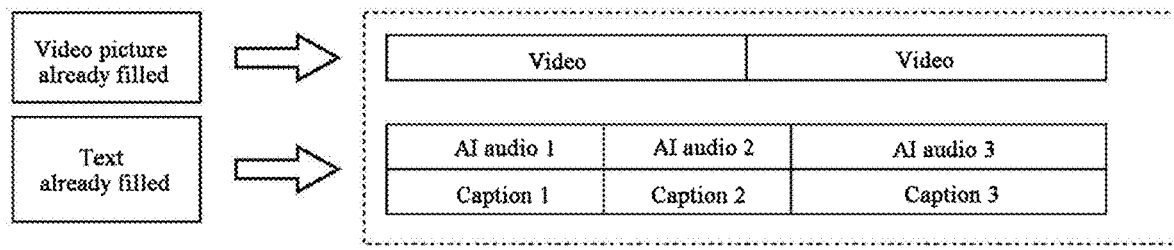
FIG. 30 is a schematic diagram showing generation of captions provided by an embodiment of the present disclosure.

As an optional but non-limiting implementation, referring to FIG. 30, regarding the editing interface of the editing subtask, after a document is imported into the preview editing page, a text-to-speech audio is automatically generated, and the audio and the caption are generated in segments according to the reading speed and correspond one to one. The text-to-speech audio is filled into the audio track, and document is filled into the caption track as the caption. Exemplarily, the splitting logic of the caption is as follows: the caption is segmented according to full stops and newlines, and an upper limit of the number of words in one segment is 10 English words.

Figure 31:
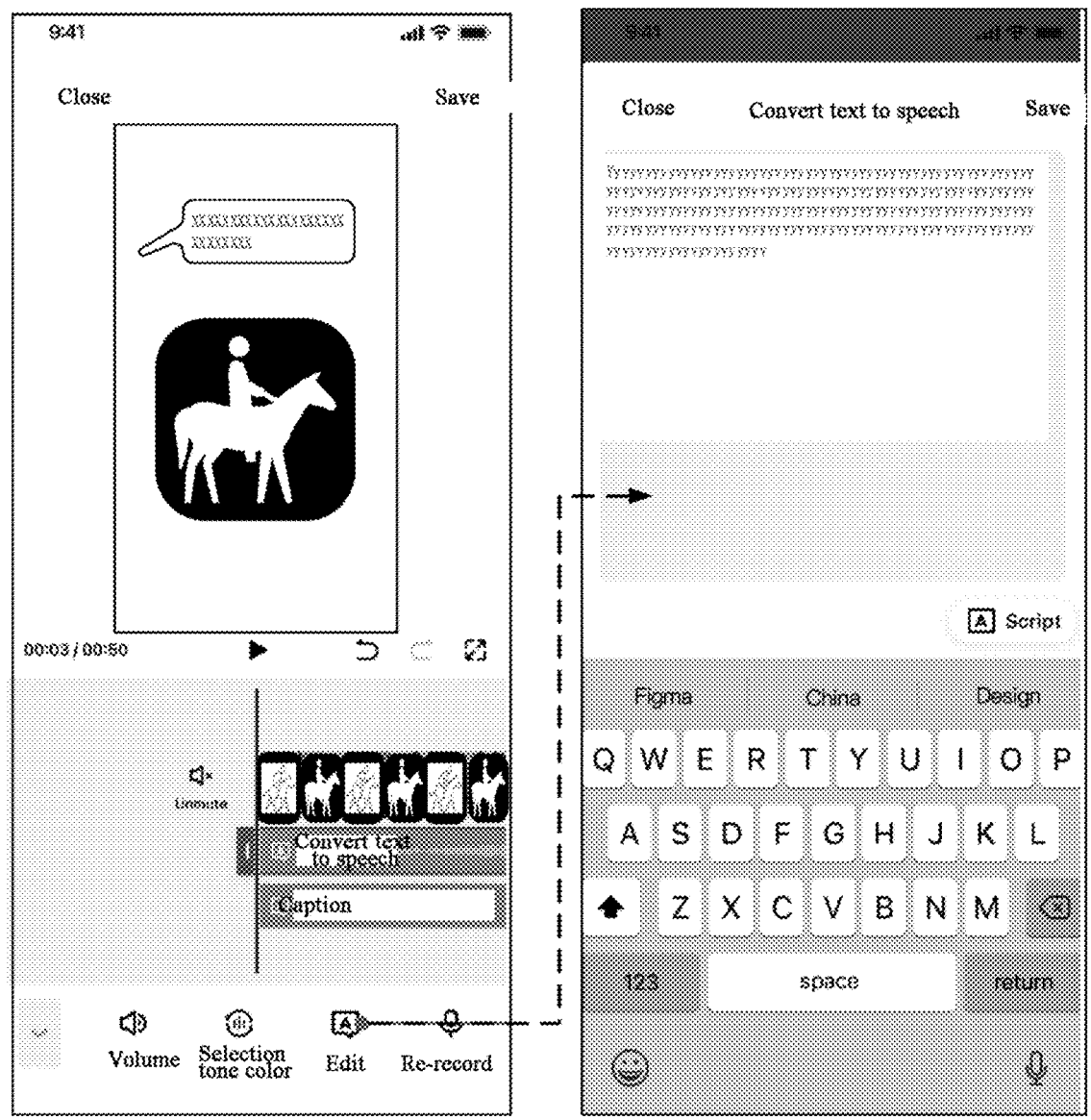
FIG. 31 is a schematic diagram showing interface transition in editing an audio segment in an audio track according to an embodiment of the present disclosure.

As an optional but non-limiting implementation, referring to FIG. 31, with regard to the editing interface of the editing subtask, an audio segment corresponding to a text-to-speech audio track is selected; an editing control pops up; in response to a triggering operation on the editing control, a document modification page is pulled up, a document corresponding to the text-to-speech audio of the segment is automatically filled, a text-to-speech audio and a caption are automatically generated after modification and overwrite the original text-to-speech audio and text-to-speech caption.

Figure 32:
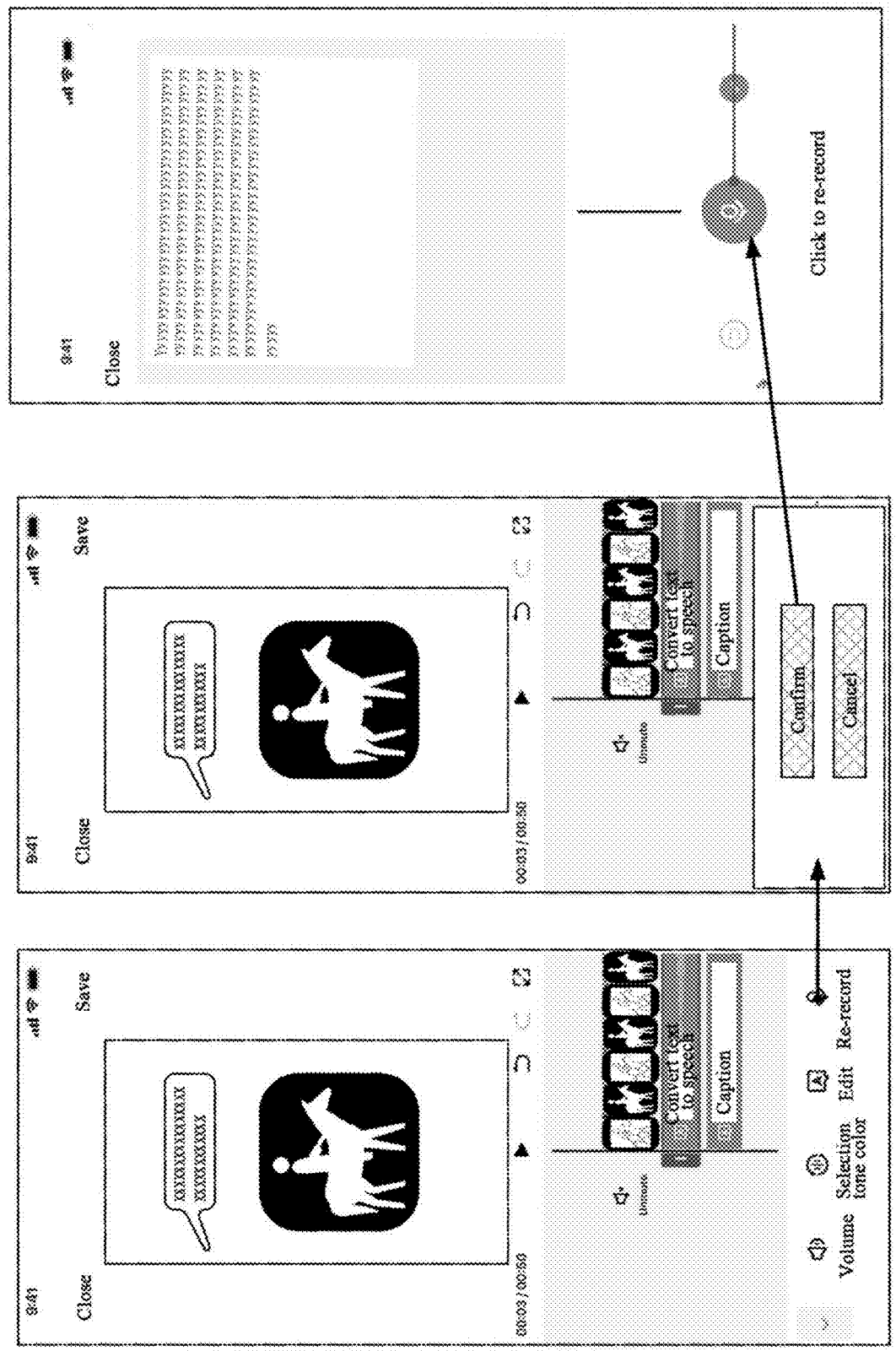
FIG. 32 is a schematic diagram showing interface transition in re-recording an audio segment in an audio track according to an embodiment of the present disclosure.

As an optional but non-limiting implementation method, with reference to FIG. 32, with regard to the editing interface of the editing subtask, an audio segment corresponding to a text-to-speech audio track is selected; a re-recording control pops up; in response to a triggering operation on the re-recording control, a recording panel is pulled up; a document audio recording page may be opened when audio re-recording is confirmed; a document corresponding to the text-to-speech conversion is filled (the document may only be displayed and cannot be edited); upon completion of the re-recording, a new caption is automatically generated according to the re-recorded audio to overwrite the original audio and caption. After the re-recording control is triggered, a prompt is displayed to prompt that both the audio and the caption of the current text-to-speech will be overwritten after the re-recording (a choice may be made that no more prompts will be given).

Figure 33:
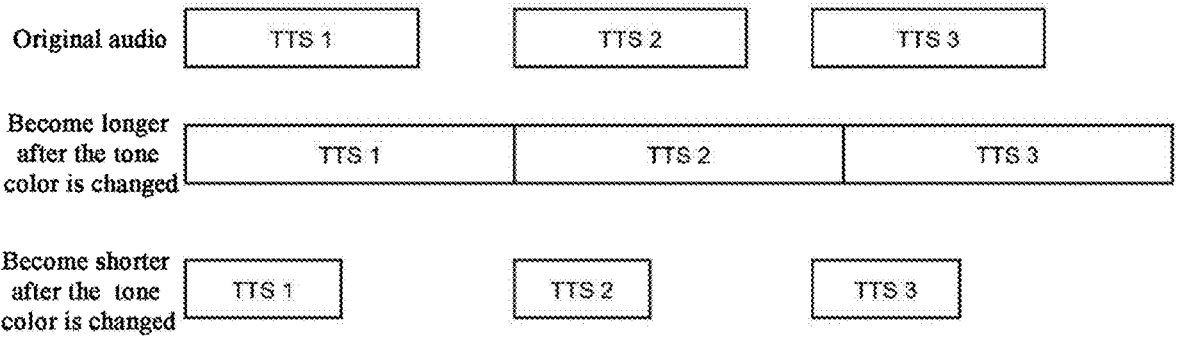
FIG. 33 is a logical representation of a tone substitution of an audio segment in an audio track as provided by an embodiment of the present disclosure.

As an optional but non-limiting implementation, referring to FIG. 33, with regard to the editing interface of the editing subtask, an audio segment corresponding to a text-to-speech audio track is selected; a timbre selection control pops up; in response to a triggering operation on the timbre selection control, a timbre panel is pulled up, a timbre type of the Text-to-Speech TTS audio is selected, and a Text-to-Speech audio corresponding to the selected timbre is generated automatically after the selection. If the audio time of the text-to-speech audio changes after the timbre is modified, a length of an associated caption needs to be aligned with the length of the new audio; if all audios are checked to be applied to adjust the timbre, the timbre will be applied to all audios.

Figure 34:
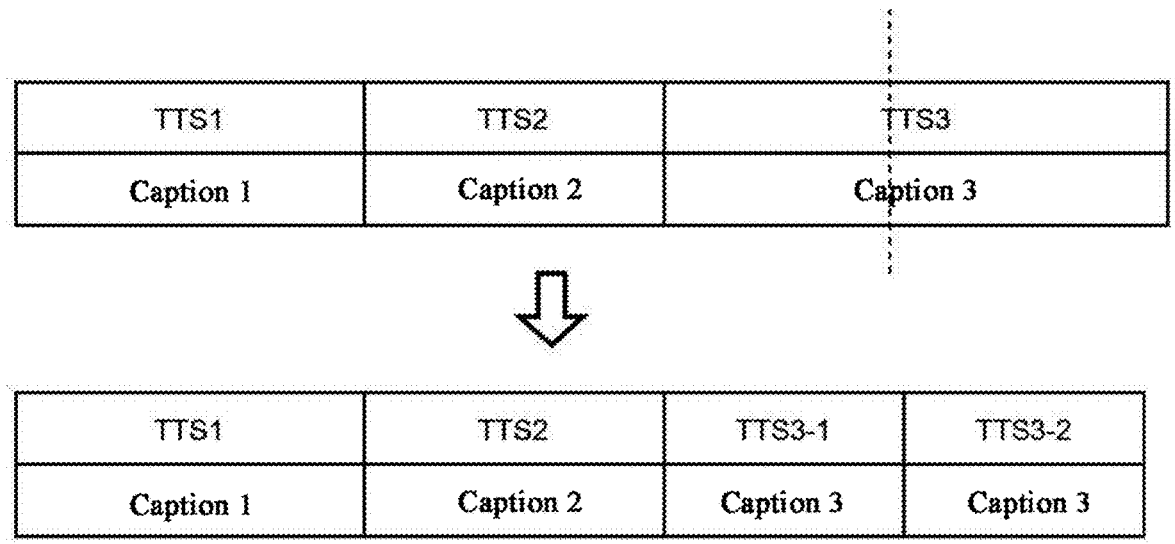
FIG. 34 is a logical representation of segmentation of captions corresponding to audio segments in an audio track as provided by an embodiment of the present disclosure.

As an optional but non-limiting implementation, referring to FIG. 34, for the editing interface of the editing subtask, an audio segment corresponding to the text-to-speech audio track is selected, the audio of the text-to-speech TTS audio may be segmented from the time axis location; if the caption is split from the middle, two copies may be made. Optionally, an audio segment corresponding to the text-to-speech audio track is selected, a deletion control pops up, and in response to a triggering operation on the deletion control, an enquiry is triggered for prompting whether to automatically delete the caption corresponding to the text-to-speech TTS. If the caption is deleted, the caption and the audio are deleted together; if the caption is not deleted, the caption will be retained. Optionally, an audio segment corresponding to a text-to-speech audio track is selected, a highlight box corresponding to the audio segment is dragged, and the duration of the audio segment may be clipped. A volume control supports adjusting the volume of the audio clip in a range of 0-1000.

As an optional but non-limiting implementation, for the editing interface of the editing subtask, a caption corresponding to a text-to-speech audio track is selected, and modifying the caption content, modifying the caption style, and deleting part of the caption may be supported. The caption content is modified as follows: click on a brush or a caption editing control to modify the caption content. An automatic speech conversion switch is turned on, and the text-to-speech audio and caption content is automatically updated after the caption is modified. If the automatic speech conversion switch is turned off, the audio content is not updated. The caption content is modified, and an inquiry is made as to whether to alter the text-to-speech audio simultaneously. If it is confirmed that the text-to-speech audio is altered simultaneously, the caption content is changed, and then a new text-to-speech audio is generated. The caption style is modified as follows: click on the brush or caption editing control to modify the caption font. The font only shows a commercially available font and the style may modify the color background. A caption default style: if the template style is automatically applied when editing from the template and adding text to speech from the track to generate the caption, the following elements will be applied: fonts, styles and animations. Part of the caption is deleted as follows: an inquiry is made as to whether to update the text-to-speech audio; if YES, generate the text-to-speech audio according to the new caption, to overwrite the original audio and caption.

Figure 35:
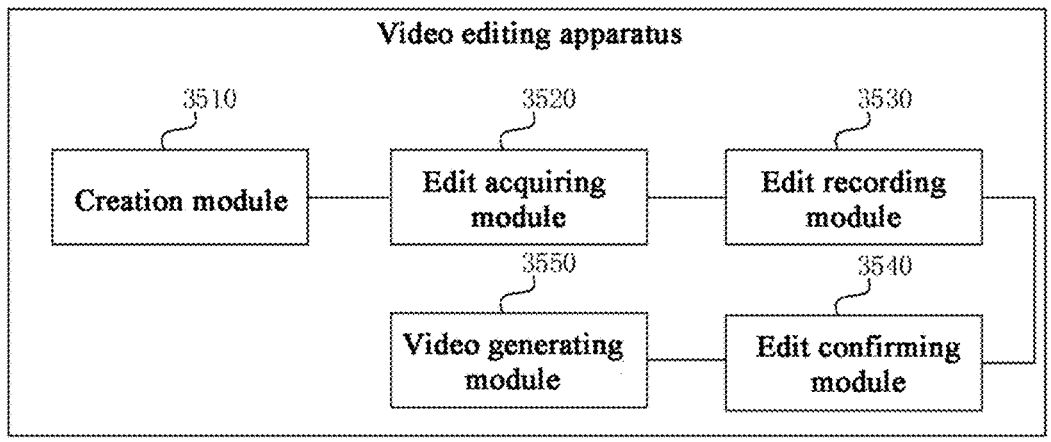
FIG. 35 is a schematic diagram of a video editing apparatus according to an embodiment of the present disclosure.

FIG. 35 is a schematic structural diagram of a video editing apparatus provided by an embodiment of the present disclosure. Embodiments of the present disclosure are applicable to a case where editing subtasks are divided for the video for editing, and the apparatus may be implemented in the form of software and/or hardware, and the video editing apparatus may be implemented by being configured in any electronic device with a network communication function, and the electronic device may be a mobile terminal, a PC terminal or a server, etc. As shown in FIG. 35, the video editing apparatus of the present embodiment may include, but is not limited to, the following: a creation module 3510, an edit obtaining module 3520, an edit recording module 3530, an edit confirming module 3540 and a video generating module 3550. Wherein:

The creation module 3510 is configured to create at least one editing subtask for a video editing task;

The edit obtaining module 3520 is configured to, in response to a first operation for triggering a target editing subtask, obtain an initial video material and present an editing interface of the target editing subtask, wherein an editing track is presented in the editing interface of the target editing subtask, a video track segment formed based on the initial video material is placed on a video editing track in the editing track, and at least one editing subtask comprises a target video editing subtask;

The edit recording module 3530 is configured to, in an editing process of the target editing subtask, record an editing operation triggered in the editing interface and present an indication identifier of the editing operation in the editing track;

The edit confirming module 3540 is configured to, in response to a second operation for confirming completion of the target editing subtask, generate an editing result of the target editing subtask based on the recorded information of the editing operation and the initial video material;

The video generating module 3550 is configured to generate a target video as an editing result of the video editing task based on the editing result of each editing subtask of the video editing task; in the target video, the initial video material is presented according to the editing effect corresponding to the editing operation.

On the basis of the above embodiments, optionally, the creating at least one editing subtask for a video editing task comprises:
 obtaining an editing template used by the video editing task;
 determining an editing subtask specified by the editing template;
 creating the at least one editing subtask according to the editing subtask specified by the editing template.

On the basis of the above-mentioned embodiment, optionally, the creating the at least one editing subtask according to the editing subtask specified by the editing template comprises:
 presenting, on an editing interface of the video editing task, an identifier of the editing subtask specified by the editing template;
 in response to a third operation for triggering to add an editing subtask, adding an identifier of a first editing subtask in the editing interface of the video editing task, and/or in response to a fourth operation for triggering to delete an editing subtask, deleting an identifier of a second editing subtask in the editing interface of the video editing task;
 wherein least one editing subtask comprises an editing subtask having an identifier presented in the editing interface of the video editing task.

On the basis of the above-mentioned embodiment, optionally, the first operation is specifically an operation of triggering an identifier of a third editing subtask presented on the editing interface of the video editing task;
 in the editing interface of the video editing task, the identifier of the third editing subtask is added at a position adjacent to the identifier of the first editing subtask.

On the basis of the above-mentioned embodiment, optionally, the generating a target video as an editing result of the video editing task based on the editing result of each editing subtask of the video editing task comprises:
 determining a combination manner specified by the editing template, the combination manner being used for indicating to combine the at least one editing subtask into the video editing task;
 according to the combination manner, synthesizing editing results of the editing subtasks of the video editing task to obtain the target video.

On the basis of the above-mentioned embodiment, optionally, the combining manner is such that the at least one editing subtask is concatenated and combined into the video editing task in an arrangement order.

On the basis of the above-mentioned embodiments, optionally, the method further comprises: determining a group designated by the editing template, and presenting the editing subtask designated by the editing template according to the designated group;

presenting content prompt information or editing prompt information corresponding to the designated group.

On the basis of the above embodiment, optionally, if the target editing subtask is a first type of editing subtask, a speech track segment formed based on a speech material is placed on an audio track of the editing track.

On the basis of the embodiments described above, optionally, the speech material is an audio material obtained by performing speech synthesis of a reading text, or the speech material is an audio material recorded by an audio collector.

On the basis of the above-mentioned embodiments, optionally, the target editing subtask is an editing subtask specified by an editing template used by the video editing task, and the reading text is obtained based on a first preset text specified by the editing template for the target editing subtask.

On the basis of the above-mentioned embodiments, optionally, the method further comprises: presenting the first preset text in a text editing area;

in response to an editing operation of the text editing area, obtaining a text in the text editing area after the editing operation as the reading text.

On the basis of the embodiments described above, optionally, a caption track segment formed based on the reading text is placed on a caption track of the editing track, the audio material is a reading audio of the reading text, and the caption track segment and the speech track segment have aligned time axis positions on the editing track.

On the basis of the above-mentioned embodiment, optionally, if the target editing subtask is a second type of editing subtask, the initial video material is a recorded video obtained by a camera;

the method further comprises:

presenting a video recording interface having a text prompt region therein, the text prompt region being configured to display and/or edit a prompt text;

in response to a video recording operation triggered on the video recording interface, dynamically broadcasting the prompt text during the video recording and generating the recorded video based on recorded images On the basis of the above-mentioned embodiment, optionally, the target editing subtask is an editing subtask specified by the editing template used by the video editing task, and the prompt text is obtained based on a second preset text specified by the editing template for the target editing subtask.

On the basis of the above-mentioned embodiments, optionally, the method further comprises: presenting the second preset text in the text prompt region;

in response to an editing operation of the text prompt region, obtaining a text in the text prompt region after the editing operation as the prompt text.

On the basis of the above-mentioned embodiments, optionally, if the target editing subtask is a third type of editing subtask, the initial video material at least comprises a first video material and a second video material, an image of the first video material and an image of the second video material are synthesized according to a designated concatenation layout into an image of a third video material, and a video track segment formed based on the third video material is placed on the video editing track in the editing track.

On the basis of the above-mentioned embodiments, optionally, the method further comprises: obtaining the second video material and determining the concatenation layout; in response to a recording trigger operation, during the recording, concatenating recorded images with images in the second video material based on the concatenation layout, and recording to generate the first video material based on the recorded images; based on the concatenation layout, video-synthesizing the first video material and the second video material into the third video material.

On the basis of the above-mentioned embodiments, optionally, the target editing subtask is an editing subtask specified by the editing template used by the video editing task.

On the basis of the above-mentioned embodiment, optionally, the generating a target video as an editing result of the video editing task based on the editing result of each editing subtask of the video editing task comprises:

obtaining an original audio material;

presenting, on the editing interface of the video editing task, an audio track segment formed based on the original audio material and a video track segment formed based on the editing result of each editing subtask of the video editing task;

in response to an editing operation on the audio track segment, obtaining a target audio material;

generating the target video based on the editing result of each editing subtask of the video editing task and the target audio material.

On the basis of the above-mentioned embodiments, optionally, the method further comprises: presenting a preview player on the editing interface of the video editing task, the preview player being used for preview playing a combination result of editing results of the editing subtasks of the video editing task.

On the basis of the above-mentioned embodiments, optionally, the method further comprises: obtaining and saving a target sub-video corresponding to the target editing subtask based on the editing result of the target editing subtask; in the target sub-video, the initial video material is presented according to the editing effect corresponding to the editing operation.

The video editing apparatus provided by an embodiment of the present disclosure may execute the video editing method provided by any embodiment of the present disclosure, and has corresponding functional modules and advantageous effects for executing the video editing method. For a detailed process, please refer to the relevant operations of the video editing method in the above embodiments.

Figure 36:
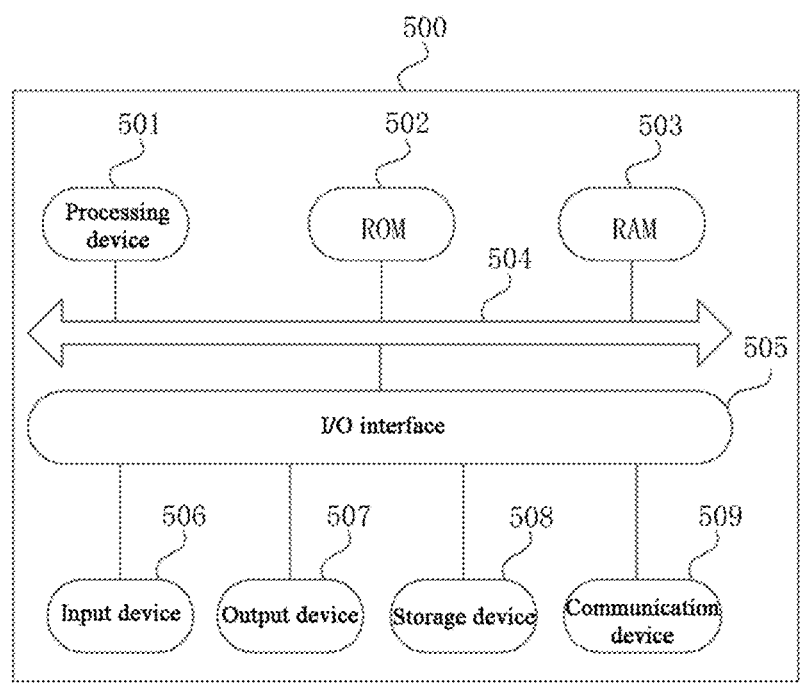
FIG. 36 is a block diagram of an electronic device provided by an embodiment of the present disclosure.

FIG. 36 is a schematic structural diagram of an electronic device according to an embodiment of the present disclosure. Reference is now made to FIG. 36, which illustrates a structural schematic diagram of an electronic device 500 (e.g., a terminal device or a sever in FIG. 36) suitable for implementing embodiments of the present disclosure. The terminal device in embodiments of the present disclosure may comprise, but not limited to, mobile terminals such as mobile phones, notebook computers, digital broadcast receivers, PDAs (Personal Digital Assistants), PADs (Tablet Computers), PMPs (Portable Multimedia Players), in-vehicle terminals (e.g., in-vehicle navigation terminals), etc. and fixed terminals such as digital TVs, desktop computers, etc. The electronic device shown in FIG. 36 is merely an example and should not impose any limitations on the functionality and scope of use of embodiments of the present disclosure.

As shown in FIG. 36, the electronic device 500 may comprise a processing device (e.g., a central processing unit, a graph processor, etc.) 501 that may perform various suitable actions and processes in accordance with a program stored in a read only memory (ROM) 502 or a program loaded from a storage device 508 into a random access memory (RAM) 503. In the RAM 503, various programs and data needed by the operation of the electronic device 500 are also stored. The processing device 501, the ROM 502, and the RAM 503 are connected to each other via a bus 504. An input/output (I/O) interface 505 is also coupled to bus 504.

In general, the following devices may be connected to the I/O interface 505: an input device 506 including, for example, a touch screen, a touch pad, a keyboard, a mouse, a camera, a microphone, an accelerometer, a gyroscope, etc.; an output device 507 including, for example, a liquid crystal display (LCD), a speaker, a vibrator, etc.; a storage device 508 including, for example, a magnetic tape, a hard disk, etc.; and a communication device 509. The communication device 509 may allow the electronic device 500 to communicate in a wireless or wired manner with other devices to exchange data. While FIG. 36 illustrates the electronic device 500 having various devices, it is to be understood that not all illustrated devices are required to be implemented or provided. More or fewer devices may optionally be implemented or provided.

In particular, the processes described above with reference to flow charts may be implemented as computer software programs in accordance with embodiments of the present disclosure. For example, embodiments of the present disclosure comprise a computer program product comprising a computer program carried on a computer-readable medium, the computer program comprising program code for performing the method illustrated by the flow charts. In such embodiments, the computer program may be downloaded and installed from a network via the communication device 509, or installed from the storage device 508, or installed from the ROM 502. When the computer program is executed by the processing device 501, the above-described functions defined in the method of the embodiments of the present disclosure are performed.

The names of messages or information interacted between devices in embodiments of the present disclosure are for illustrative purposes only and are not intended to limit the scope of such messages or information.

The electronic device provided by the present embodiment of the present disclosure and the video editing method provided by the above embodiment belong to the same inventive concept. Reference may be made to the above embodiment for technical details not described in detail in the present embodiment. Furthermore, the present embodiment and the above embodiment have the same advantageous effects.

Embodiments of the present disclosure provide a computer storage medium on which a computer program is stored, the program, when executed by a processor, implementing the video editing method provided by the above embodiment.

It is appreciated that the computer-readable medium described above in the present disclosure may be either a computer-readable signal medium or a computer-readable storage medium, or any combination of the two. The computer-readable storage medium may be, for example but not limited to, an electronic, magnetic, optical, electromagnetic, infrared, or semiconductor system, apparatus, or device, or a combination of any of the above. More specific examples of the computer-readable storage medium may comprise, but are not limited to: an electrical connection having one or more wires, a portable computer magnetic disk, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the above. In the present disclosure, the computer-readable storage medium may be any tangible medium that contains or stores a program that may be used by or in conjunction with an instruction execution system, apparatus, or device. In the present disclosure, the computer-readable signal medium may comprise a data signal embodied in baseband or propagated as part of a carrier carrying computer-readable program code. Such propagated data signals may take many forms, including but not limited to, electromagnetic signals, optical signals, or any suitable combinations thereof. The computer-readable signal medium may also be any computer-readable medium other than a computer-readable storage medium that may send, propagate, or transport the program for use by or for use in conjunction with the instruction execution system, apparatus, or device. The program code contained on the computer-readable medium may be transmitted with any suitable medium including, but not limited to: electrical wire, optic cable, RF (radio frequency), and the like, or any suitable combinations thereof.

In some embodiments, the client and the server may communicate using any currently known or future-developed network protocol, such as HTTP (HyperText Transfer Protocol), and may be interconnected with any form or medium of digital data communication (e.g., a communication network). Examples of the communication network comprise local area networks ("LANs"), wide area networks ("WANs"), international networks (e.g., the Internet), and peer-to-peer networks (e.g., ad hoc peer-to-peer networks), as well as any currently known or future-developed networks.

The computer readable medium may be contained in the above-described electronic device; it may also be present separately and not installed into the electronic device.

The computer-readable medium carries one or more programs that, when executed by the terminal device, cause:

The computer-readable medium carries one or more programs that, when executed by the terminal device, cause: the terminal device to perform the following actions: creating at least one editing subtask for a video editing task; in response to a first operation for triggering a target editing subtask, obtaining an initial video material and presenting an editing interface of the target editing subtask, wherein an editing track is presented in the editing interface of the target editing subtask, a video track segment formed based on the initial video material is placed on a video editing track in the editing track, and at least one editing subtask comprises a target video editing subtask; in an editing process of the target editing subtask, recording the editing operation triggered in the editing interface and present an indication identifier of the editing operation in the editing track; in response to a second operation for confirming completion of the target editing subtask, generating an editing result of the target editing subtask based on the recorded information of the editing operation and the initial video material; based on the editing result of each editing subtask of the video editing task, generating a target video as an editing result of the video editing task; in the target video, the initial video material is presented according to the editing effect corresponding to the editing operation.

The computer program code for carrying out operations of the present disclosure may be written in one or more programming languages or combinations thereof. The programming languages include, but not limited to, object-oriented programming languages, such as Java, smalltalk, C++, and conventional procedural programming languages, such as the "C" language or similar programming languages. The program code may be executed entirely on the user's computer, executed partly on the user's computer, executed as a stand-alone software package, executed partly on the user's computer and partly on a remote computer, or executed entirely on the remote computer or a server. In the case of the remote computer, the remote computer may be connected to the user's computer through any type of network, including a local area network (LAN) or a wide area network (WAN), or it may be connected to an external computer (e.g., through the Internet using an Internet Service Provider).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special-purpose hardware and computer instructions.

The units described in connection with the embodiments disclosed herein may be implemented in a software or hardware manner. The names of the units do not constitute limitations of the units themselves in a certain case. For example, the first acquisition unit may further be described as "a unit for obtaining at least two internet protocol addresses".

The functions described herein above may be performed, at least in part, by one or more hardware logic components. For example, without limitation, exemplary types of hardware logic components that may be used comprise: a Field Programmable Gate Array (FPGA), an Application Specific Integrated Circuits (ASIC), an Application Specific Standard Products (ASSP), a Systems On Chip (SOC), a Complex Programmable Logic Device (CPLD), and so on.

In the context of the present disclosure, the machine-readable medium may be a tangible medium that may contain or store a program for use by or for use in conjunction with an instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus, or device, or any suitable combinations thereof. More specific examples of the machine-readable storage medium would comprise an electrical connection based on one or more wires, a portable computer diskette, a hard disk, a random access memory (RAM), a read-only memory (ROM), an erasable programmable read-only memory (EPROM or Flash memory), an optical fiber, a compact disc read-only memory (CD-ROM), an optical storage device, a magnetic storage device, or any suitable combination thereof.

According to one or more embodiments of the present disclosure, Example 1 provides a video editing method, comprising:
  creating at least one editing subtask for a video editing task;
  in response to a first operation for triggering a target editing subtask, obtaining an initial video material and presenting an editing interface of the target editing subtask, wherein an editing track is presented in the editing interface of the target editing subtask, a video track segment formed based on the initial video material is placed on a video editing track in the editing track, and at least one editing subtask comprises a target video editing subtask;
  in an editing process of the target editing subtask, recording the editing operation triggered in the editing interface and present an indication identifier of the editing operation in the editing track;
  in response to a second operation for confirming completion of the target editing subtask, generating an editing result of the target editing subtask based on the recorded information of the editing operation and the initial video material;
  based on the editing result of each editing subtask of the video editing task, generating a target video as an editing result of the video editing task; in the target video, the initial video material is presented according to the editing effect corresponding to the editing operation.

According to one or more embodiments of the present disclosure, Example 2 provides the method of Example 1, wherein the creating at least one editing subtask for a video editing task comprises:
  obtaining an editing template used by the video editing task;
  determining an editing subtask specified by the editing template;
  creating the at least one editing subtask according to the editing subtask specified by the editing template.

According to one or more embodiments of the present disclosure, Example 3 provides the method of Example 2, wherein the creating the at least one editing subtask according to the editing subtask specified by the editing template comprises:
  presenting, on an editing interface of the video editing task, an identifier of the editing subtask specified by the editing template;
  in response to a third operation for triggering to add an editing subtask, adding an identifier of a first editing subtask in the editing interface of the video editing task, and/or in response to a fourth operation for triggering to delete an editing subtask, deleting an identifier of a second editing subtask in the editing interface of the video editing task;
  wherein least one editing subtask comprises an editing subtask having an identifier presented in the editing interface of the video editing task.

According to one or more embodiments of the present disclosure, Example 4 provides the method of Example 3,
the first operation is specifically an operation of triggering an identifier of a third editing subtask presented on the editing interface of the video editing task;
in the editing interface of the video editing task, the identifier of the third editing subtask is added at a position adjacent to the identifier of the first editing subtask.

According to one or more embodiments of the present disclosure, Example 5 provides the method of Example 2, wherein the generating a target video as an editing result of the video editing task based on the editing result of each editing subtask of the video editing task comprises:
determining a combination manner specified by the editing template, the combination manner being used for indicating to combine the at least one editing subtask into the video editing task;
according to the combination manner, synthesizing editing results of the editing subtasks of the video editing task to obtain the target video.

According to one or more embodiments of the present disclosure, Example 6 provides the method of Example 5, wherein the combining manner is such that the at least one editing subtask is concatenated and combined into the video editing task in an arrangement order.

According to one or more embodiments of the present disclosure, Example 7 provides the method of Example 2, and the method further comprises:
determining a group designated by the editing template, and presenting the editing subtask designated by the editing template according to the designated group;
presenting content prompt information or editing prompt information corresponding to the designated group.

According to one or more embodiments of the present disclosure, Example 8 provides the method of Example 1, wherein if the target editing subtask is a first type of editing subtask, a speech track segment formed based on a speech material is placed on an audio track of the editing track.

According to one or more embodiments of the present disclosure, Example 9 provides the method of Example 8, wherein the speech material is an audio material obtained by performing speech synthesis of a reading text, or the speech material is an audio material recorded by an audio collector.

According to one or more embodiments of the present disclosure, Example 10 provides the method of Example 9, the target editing subtask is an editing subtask specified by an editing template used by the video editing task, and the reading text is obtained based on a first preset text specified by the editing template for the target editing subtask.

According to one or more embodiments of the present disclosure, Example 11 provides the method of Example 10, and the method further comprises:
presenting the first preset text in a text editing area;
in response to an editing operation of the text editing area, obtaining a text in the text editing area after the editing operation as the reading text.

According to one or more embodiments of the present disclosure, Example 12 provides the method of Example 8, a caption track segment formed based on the reading text is placed on a caption track of the editing track, the audio material is a reading audio of the reading text, and the caption track segment and the speech track segment have aligned time axis positions on the editing track.

According to one or more embodiments of the present disclosure, Example 13 provides the method of Example 1, wherein if the target editing subtask is a second type of editing subtask, the initial video material is a recorded video obtained by a camera;
the method further comprises:
presenting a video recording interface having a text prompt region therein, the text prompt region being configured to display and/or edit a prompt text;
in response to a video recording operation triggered on the video recording interface, dynamically broadcasting the prompt text during the video recording and generating the recorded video based on recorded images.

According to one or more embodiments of the present disclosure, Example 14 provides the method of Example 13, the target editing subtask is an editing subtask specified by the editing template used by the video editing task, and the prompt text is obtained based on a second preset text specified by the editing template for the target editing subtask.

According to one or more embodiments of the present disclosure, Example 15 provides the method of Example 14, and the method further comprises:
presenting the second preset text in the text prompt region;
in response to an editing operation of the text prompt region, obtaining a text in the text prompt region after the editing operation as the prompt text.

According to one or more embodiments of the present disclosure, Example 16 provides the method of Example 1, if the target editing subtask is a third type of editing subtask, the initial video material at least comprises a first video material and a second video material, an image of the first video material and an image of the second video material are synthesized according to a designated concatenation layout into an image of a third video material, and a video track segment formed based on the third video material is placed on the video editing track in the editing track.

According to one or more embodiments of the present disclosure, Example 17 provides the method of Example 16, and the method further comprises:
obtaining the second video material and determining the concatenation layout;
in response to a recording trigger operation, during the recording, concatenating recorded images with images in the second video material based on the concatenation layout, and recording to generate the first video material based on the recorded images;
based on the concatenation layout, video-synthesizing the first video material and the second video material into the third video material.

According to one or more embodiments of the present disclosure, Example 18 provides the method of any of examples 1-17, and the generating a target video as an editing result of the video editing task based on the editing result of each editing subtask of the video editing task comprises:
obtaining an original audio material;
presenting, on the editing interface of the video editing task, an audio track segment formed based on the original audio material and a video track segment formed based on the editing result of each editing subtask of the video editing task;
in response to an editing operation on the audio track segment, obtaining a target audio material;
generating the target video based on the editing result of each editing subtask of the video editing task and the target audio material.

According to one or more embodiments of the present disclosure, Example 19 provides the method of any of examples 1-17, and the method further comprises:

presenting a preview player on the editing interface of the video editing task, the preview player being used for preview playing a combination result of editing results of the editing subtasks of the video editing task.

According to one or more embodiments of the present disclosure, Example 20 provides the method of any of examples 1-17, and the method further comprises:

obtaining and saving a target sub-video corresponding to the target editing subtask based on the editing result of the target editing subtask; in the target sub-video, the initial video material is presented according to the editing effect corresponding to the editing operation.

What are described above are only preferred embodiments of the present disclosure and illustrate the technical principles employed. It will be appreciated by those skilled in the art that the scope of the present disclosure is not limited to technical solutions formed by specific combinations of the above technical features, and meanwhile should also comprise other technical solutions formed by any combinations of the above technical features or equivalent features thereof, for example, technical solutions formed by replacement of the above technical features with technical features having similar functions disclosed by the present disclosure.

In addition, while operations are depicted in a particular order, this should not be understood as requiring that the operations be performed in the particular order shown or in a sequential order. In certain circumstances, multitasking and parallel processing may be advantageous. As such, while several specific implementation details have been included in the above discussion, these should not be construed as limiting the scope of the present disclosure.

Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above.

Rather, the specific features and acts described above are merely exemplary forms of implementing the claims.

We claim:

1. A video editing method, wherein the method comprises:
    creating at least one editing subtask for a video editing task;
    in response to a first operation for triggering a target editing subtask, obtaining an initial video material and presenting an editing interface of the target editing subtask, wherein an editing track is presented in the editing interface of the target editing subtask, a video track segment formed based on the initial video material is placed on a video editing track in the editing track, and the at least one editing subtask comprises the target video editing subtask;
    in an editing process of the target editing subtask, recording the editing operation triggered in the editing interface and present an indication identifier of the editing operation in the editing track;
    in response to a second operation for confirming completion of the target editing subtask, generating an editing result of the target editing subtask based on the recorded information of the editing operation and the initial video material;
    based on the editing result of each editing subtask of the video editing task, generating a target video as an editing result of the video editing task; in the target video, the initial video material is presented according to the editing effect corresponding to the editing operation.

2. The method of claim 1, wherein creating at least one editing subtask for a video editing task comprises:
    obtaining an editing template used by the video editing task;
    determining an editing subtask specified by the editing template;
    creating the at least one editing subtask according to the editing subtask specified by the editing template.

3. The method of claim 2, wherein creating the at least one editing subtask according to the editing subtask specified by the editing template comprises:
    presenting, on an editing interface of the video editing task, an identifier of the editing subtask specified by the editing template;
    in response to a third operation for triggering to add an editing subtask, adding an identifier of a first editing subtask in the editing interface of the video editing task, and/or in response to a fourth operation for triggering to delete an editing subtask, deleting an identifier of a second editing subtask in the editing interface of the video editing task;
    wherein the least one editing subtask comprises an editing subtask having an identifier presented in the editing interface of the video editing task.

4. The method of claim 3, wherein
    the third operation is specifically an operation of triggering an identifier of a third editing subtask presented on the editing interface of the video editing task;
    in the editing interface of the video editing task, the identifier of the third editing subtask is added at a position adjacent to the identifier of the first editing subtask.

5. The method of claim 2, wherein generating a target video as an editing result of the video editing task based on the editing result of each editing subtask of the video editing task comprises:
    determining a combination manner specified by the editing template, the combination manner being used for indicating to combine the at least one editing subtask into the video editing task;
    according to the combination manner, synthesizing editing results of the editing subtasks of the video editing task to obtain the target video.

6. The method of claim 5, wherein the combining manner is such that the at least one editing subtask is concatenated and combined into the video editing task in an arrangement order.

7. The method of claim 2, wherein the method further comprises:
    determining a group designated by the editing template, and presenting the editing subtask designated by the editing template according to the designated group;
    presenting content prompt information or editing prompt information corresponding to the designated group.

8. The method of claim 1, wherein in response to the target editing subtask is a first type of editing subtask, a speech track segment formed based on a speech material is placed on an audio track of the editing track.

9. The method of claim 8, wherein the speech material is an audio material obtained by performing speech synthesis of a reading text, or the speech material is an audio material recorded by an audio collector.

10. The method of claim 9, wherein the target editing subtask is an editing subtask specified by an editing template used by the video editing task, and the reading text is obtained based on a first preset text specified by the editing template for the target editing subtask.

11. The method of claim 8, wherein a caption track segment formed based on the reading text is placed on a caption track of the editing track, the audio material is a reading audio of the reading text, and the caption track segment and the speech track segment have aligned time axis positions on the editing track.

12. The method of claim 1, wherein the method further comprises:
presenting the first preset text in a text editing area;
in response to an editing operation of the text editing area, obtaining a text in the text editing area after the editing operation as the reading text.

13. The method of claim 1, wherein in response to the target editing subtask is a second type of editing subtask, the initial video material is a recorded video obtained by a camera;
the method further comprises:
presenting a video recording interface having a text prompt region therein, the text prompt region being configured to display and/or edit a prompt text;
in response to a video recording operation triggered on the video recording interface, dynamically broadcasting the prompt text during the video recording and generating the recorded video based on recorded images.

14. The method of claim 13, wherein the target editing subtask is an editing subtask specified by the editing template used by the video editing task, and the prompt text is obtained based on a second preset text specified by the editing template for the target editing subtask; and/or
presenting the second preset text in the text prompt region;
in response to an editing operation of the text prompt region, obtaining a text in the text prompt region after the editing operation as the prompt text.

15. The method of claim 1, wherein in response to the target editing subtask is a third type of editing subtask, the initial video material at least comprises a first video material and a second video material, an image of the first video material and an image of the second video material are synthesized according to a designated concatenation layout into an image of a third video material, and a video track segment formed based on the third video material is placed on the video editing track in the editing track.

16. The method of claim 15, wherein the method further comprises:
obtaining the second video material and determining the concatenation layout;
in response to a recording trigger operation, during the recording, concatenating recorded images with images in the second video material based on the concatenation layout, and recording to generate the first video material based on the recorded images;
based on the concatenation layout, video-synthesizing the first video material and the second video material into the third video material.

17. The method of claim 1, wherein the generating a target video as an editing result of the video editing task based on the editing result of each editing subtask of the video editing task comprises:
obtaining an original audio material;
presenting, on the editing interface of the video editing task, an audio track segment formed based on the original audio material and a video track segment formed based on the editing result of each editing subtask of the video editing task;
in response to an editing operation on the audio track segment, obtaining a target audio material;
generating the target video based on the editing result of each editing subtask of the video editing task and the target audio material.

18. The method of claim 1, wherein the method further comprises:
presenting a preview player on the editing interface of the video editing task, the preview player being used for preview playing a combination result of editing results of the editing subtasks of the video editing task; and
obtaining and saving a target sub-video corresponding to the target editing subtask based on the editing result of the target editing subtask; in the target sub-video, presenting the initial video material according to the editing effect corresponding to the editing operation.

19. An electronic device, wherein the electronic device comprises:
one or more processors;
a storage device for storing one or more programs,
the one or more programs, when executed by the one or more processors, cause the one or more processors to:
create at least one editing subtask for a video editing task;
in response to a first operation for triggering a target editing subtask, obtain an initial video material and presenting an editing interface of the target editing subtask, wherein an editing track is presented in the editing interface of the target editing subtask, a video track segment formed based on the initial video material is placed on a video editing track in the editing track, and the at least one editing subtask comprises the target video editing subtask;
in an editing process of the target editing subtask, record the editing operation triggered in the editing interface and present an indication identifier of the editing operation in the editing track;
in response to a second operation for confirming completion of the target editing subtask, generate an editing result of the target editing subtask based on the recorded information of the editing operation and the initial video material;
based on the editing result of each editing subtask of the video editing task, generate a target video as an editing result of the video editing task; in the target video, the initial video material is presented according to the editing effect corresponding to the editing operation.

20. A non-transitory storage medium containing computer-executable instructions, wherein the computer-executable instructions, when executed by a computer processor, cause the computer processor to:
create at least one editing subtask for a video editing task;
in response to a first operation for triggering a target editing subtask, obtain an initial video material and presenting an editing interface of the target editing subtask, wherein an editing track is presented in the editing interface of the target editing subtask, a video track segment formed based on the initial video material is placed on a video editing track in the editing track, and the at least one editing subtask comprises the target video editing subtask;

in an editing process of the target editing subtask, record the editing operation triggered in the editing interface and present an indication identifier of the editing operation in the editing track;

in response to a second operation for confirming completion of the target editing subtask, generate an editing result of the target editing subtask based on the recorded information of the editing operation and the initial video material;

based on the editing result of each editing subtask of the video editing task, generate a target video as an editing result of the video editing task; in the target video, the initial video material is presented according to the editing effect corresponding to the editing operation.

\* \* \* \* \*